US007493425B2

(12) United States Patent
Arndt et al.

(10) Patent No.: US 7,493,425 B2
(45) Date of Patent: Feb. 17, 2009

(54) METHOD, SYSTEM AND PROGRAM PRODUCT FOR DIFFERENTIATING BETWEEN VIRTUAL HOSTS ON BUS TRANSACTIONS AND ASSOCIATING ALLOWABLE MEMORY ACCESS FOR AN INPUT/OUTPUT ADAPTER THAT SUPPORTS VIRTUALIZATION

(75) Inventors: Richard Louis Arndt, Austin, TX (US); Giora Biran, Zichron-Yaahov (IL); Patrick Allen Buckland, Austin, TX (US); Harvey Gene Kiel, Rochester, MN (US); Vadim Makhervaks, Austin, TX (US); Renato John Recio, Austin, TX (US); Leah Shalev, Zichron-Yaakov (IL); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 11/066,424

(22) Filed: Feb. 25, 2005

(65) Prior Publication Data

US 2006/0195642 A1 Aug. 31, 2006

(51) Int. Cl.
*G06F 13/28* (2006.01)

(52) U.S. Cl. ............................ 710/28; 710/22; 710/36; 710/107; 710/308; 703/24; 703/25

(58) Field of Classification Search .................. 710/22, 710/28, 36, 100, 107, 308; 703/24, 25
See application file for complete search history.

(56) References Cited

U.S. PATENT DOCUMENTS 6,061,753 A * 5/2000 Ericson ...................... 710/107
6,111,894 A 8/2000 Bender et al.
6,134,641 A 10/2000 Anand
6,453,392 B1 9/2002 Flynn, Jr.
6,629,157 B1 9/2003 Falardeau et al.
6,629,162 B1 9/2003 Arndt et al.
6,662,289 B1 12/2003 Ang
6,665,759 B2 12/2003 Dawkins et al.
6,704,284 B1 3/2004 Stevenson et al.
6,804,741 B2 10/2004 Cowan (Continued)

FOREIGN PATENT DOCUMENTS

EP 1508855 A2 8/2004

OTHER PUBLICATIONS

U.S. Appl. No. 11/066,645, filed Feb. 25, 2005, Arndt et al.

(Continued)

*Primary Examiner*—Glenn A Auve
*Assistant Examiner*—Nimesh G Patel
(74) *Attorney, Agent, or Firm*—Duke W. Yee; Diana Roberts-Gerhardt; Wayne P. Bailey

(57) ABSTRACT

A method, system and computer program product that allows a System Image within a multiple System Image Virtual Server to maintain isolation from the other system images while directly exposing a portion, or all, of its associated System Memory to a shared PCI Adapter without the need for each I/O operation to be analyzed and verified by a component trusted by the LPAR manager.

16 Claims, 16 Drawing Sheets

U.S. PATENT DOCUMENTS 6,823,418 B2 11/2004 Langendorf et al.
6,880,021 B2 4/2005 Easton et al.
6,973,510 B2 12/2005 Arndt et al.
7,000,088 B1 * 2/2006 Rudeseal et al. ............ 711/173
7,080,291 B2 * 7/2006 Moriki et al. ................. 714/53
2002/0069335 A1 * 6/2002 Flylnn, Jr. ................... 711/153
2002/0085493 A1 7/2002 Pekkala et al.
2002/0112102 A1 * 8/2002 Tarui et al. .................... 710/60
2002/0129172 A1 9/2002 Baskey et al.
2002/0129212 A1 * 9/2002 Lee et al. .................... 711/152
2003/0014738 A1 1/2003 Dawkins et al.
2003/0061379 A1 3/2003 Craddock et al.
2003/0110205 A1 6/2003 Johnson
2003/0204648 A1 10/2003 Arndt
2003/0236852 A1 * 12/2003 Fernandes et al. ........... 709/215
2004/0202189 A1 10/2004 Arndt et al.
2005/0076157 A1 4/2005 Serizawa et al.
2005/0091365 A1 4/2005 Lowell et al.
2005/0097384 A1 5/2005 Uehara et al.
2005/0102682 A1 5/2005 Shah et al.
2005/0119996 A1 6/2005 Ohata et al.
2005/0120160 A1 6/2005 Plouffe et al.
2005/0182788 A1 * 8/2005 Arndt et al. ............. 707/103 R
2005/0240932 A1 * 10/2005 Billau et al. ................ 718/104
2005/0246450 A1 11/2005 Enko et al.
2006/0044301 A1 3/2006 Ha
2006/0069828 A1 * 3/2006 Goldsmith .................. 710/100
2006/0112376 A1 5/2006 Broberg et al.
2006/0123204 A1 * 6/2006 Brown et al. ................ 711/153
2006/0184349 A1 8/2006 Goud et al.
2006/0239287 A1 10/2006 Johnsen et al.
2006/0242330 A1 10/2006 Torudbakken et al.
2006/0242332 A1 10/2006 Johnsen et al.
2006/0242333 A1 10/2006 Johnsen et al.
2006/0242352 A1 10/2006 Torudbakken et al.
2006/0242354 A1 10/2006 Johnsen et al.
2006/0253619 A1 11/2006 Torudbakken et al.

OTHER PUBLICATIONS

U.S. Appl. No. 11/065,869, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/066,419, filed Feb. 25, 2005, Arndt et al.
U.S. Appl. No. 11/066,931, filed Feb. 25, 2005, Arndt et al.
U.S. Appl. No. 11/068,664, filed Feb. 28, 2005, Arndt et al.
U.S. Appl. No. 11/066,353, filed Feb. 25, 2005, Arndt et al.
U.S. Appl. No. 11/065,830, filed Feb. 25, 2005, Arndt et al.
U.S. Appl. No. 11/065,829, filed Feb. 25, 2005, Arndt et al.
U.S. Appl. No. 11/066,517, filed Feb. 25, 2005, Arndt et al.
U.S. Appl. No. 11/065,821, filed Feb. 25, 2005, Arndt et al.
U.S. Appl. No. 11/066,487, filed Feb. 25, 2005, Arndt et al.
U.S. Appl. No. 11/066,519, filed Feb. 25, 2005, Arndt et al.
U.S. Appl. No. 11/066,521, filed Feb. 25, 2005, Arndt et al.
U.S. Appl. No. 11/067,354, filed Feb. 25, 2005, Arndt et al.
U.S. Appl. No. 11/066,590, filed Feb. 25, 2005, Arndt et al.
U.S. Appl. No. 11/065,823, filed Feb. 25, 2005, Arndt et al.
Jann et al., "Dynamic Reconfiguration: Basic Building Blocks for Autonomic Computing on IBM PSeries Servers," IBM System Journal, vol. 42, Jan. 2003 pp. 29-37.
"Logical Partition Security in the IBM @server pSeries 690", IBM, 2002, pp. 1-13.
Hensbergen, "The Effect of Virtualization on OS Interference", IBM Research, Proceedings of 1st workshop on Operating Systems Inteference in High Performance Applications, Aug. 2005, p. 1-6.
"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

* cited by examiner

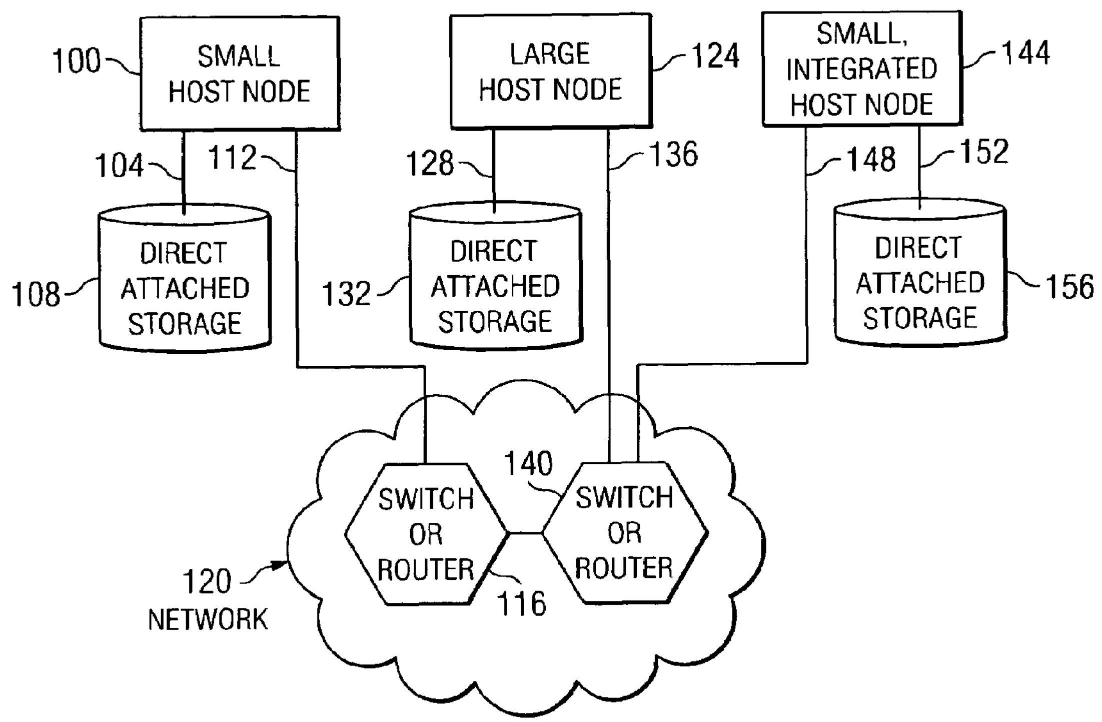
FIG. 1
100
SMALL HOST NODE
LARGE HOST NODE
124
SMALL, INTEGRATED HOST NODE
144
104
112
128
136
148
152
108
DIRECT ATTACHED STORAGE
132
DIRECT ATTACHED STORAGE
DIRECT ATTACHED STORAGE
156
140
SWITCH OR ROUTER
SWITCH OR ROUTER
120
NETWORK
116

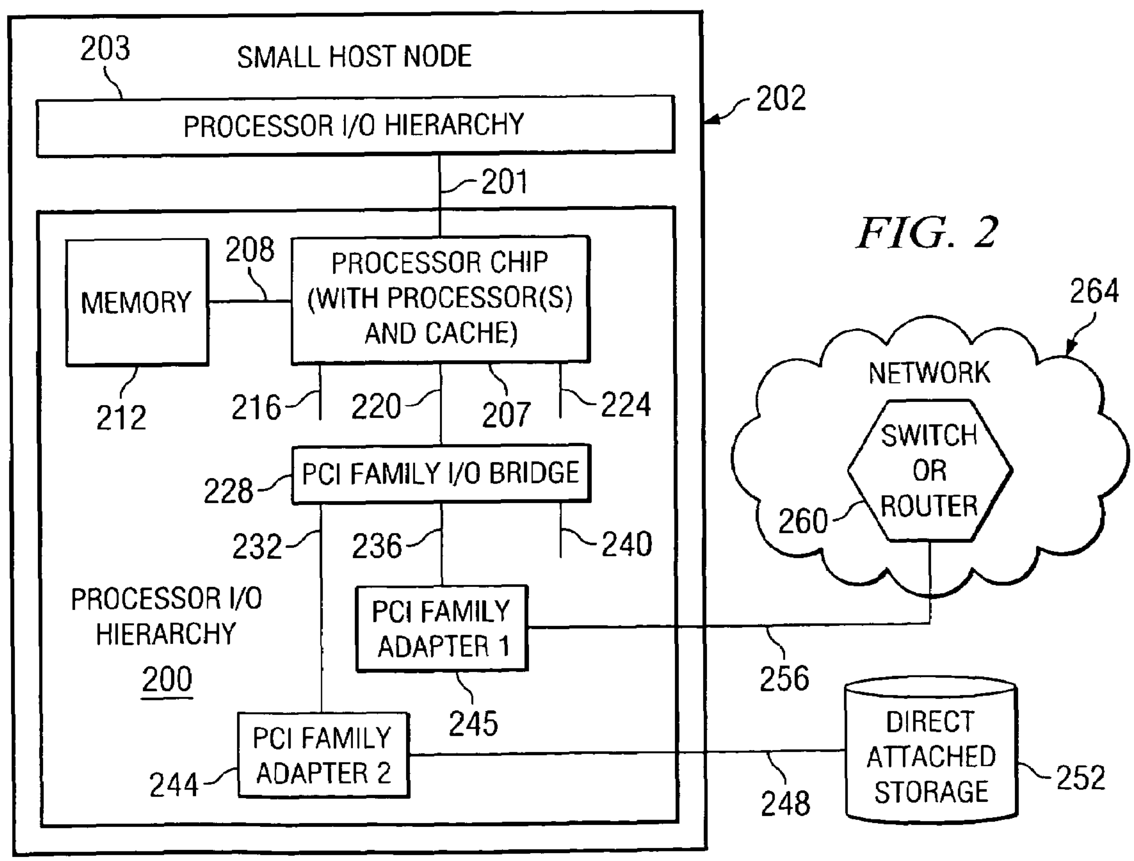
203
SMALL HOST NODE
202
PROCESSOR I/O HIERARCHY
201
FIG. 2
MEMORY
208
PROCESSOR CHIP (WITH PROCESSOR(S) AND CACHE)
264
212
216
220
207
224
NETWORK
SWITCH OR ROUTER
228
PCI FAMILY I/O BRIDGE
260
232
236
240
PROCESSOR I/O HIERARCHY
200
PCI FAMILY ADAPTER 1
256
245
DIRECT ATTACHED STORAGE
PCI FAMILY ADAPTER 2
244
248
252

PCI 500

ADDRESS PHASE 508
DATA PHASE 512
TURNAROUND CYCLE 516
504
ARBITRATION FOR NEXT TRANSFER

PCI-X 520

MISC 536
TAG 540
REQUESTOR BUS NUMBER 544
REQUESTOR DEVICE NUMBER 548
REQUESTOR FUNCTION NUMBER 552
BYTE COUNT 556

ADDRESS PHASE 528
ATTRIBUTE PHASE 532
RESPONSE PHASE 560
DATA PHASE 564
TURNAROUND CYCLE 566
524
ARBITRATION FOR NEXT TRANSFER

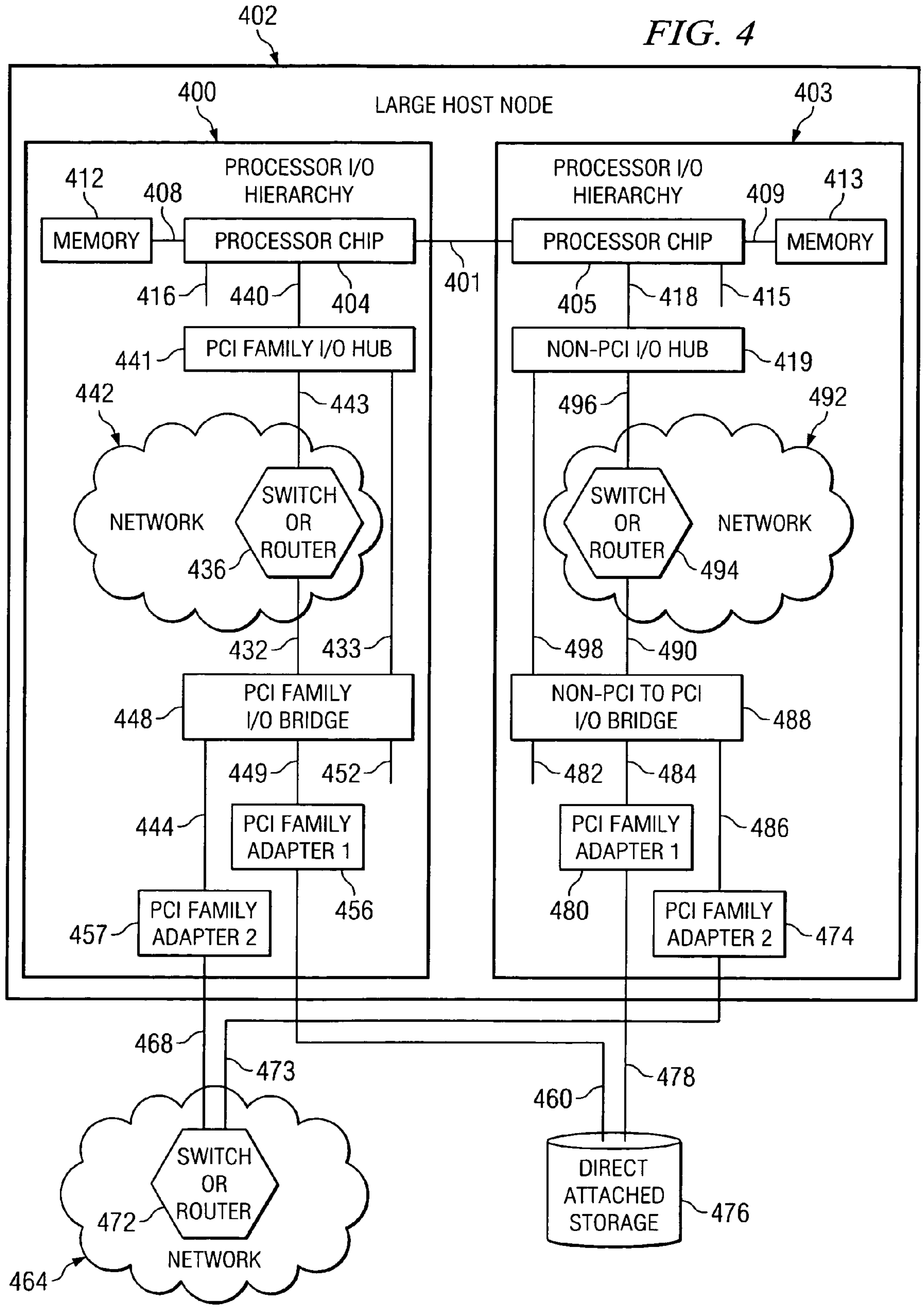
FIG. 4
402
LARGE HOST NODE
400
403
PROCESSOR I/O HIERARCHY
PROCESSOR I/O HIERARCHY
412
408
MEMORY
PROCESSOR CHIP
PROCESSOR CHIP
MEMORY
409
413
401
416
440
404
405
418
415
PCI FAMILY I/O HUB
NON-PCI I/O HUB
441
419
442
443
496
492
NETWORK
SWITCH OR ROUTER
436
SWITCH OR ROUTER
NETWORK
494
432
433
498
490
PCI FAMILY I/O BRIDGE
448
NON-PCI TO PCI I/O BRIDGE
488
449
452
482
484
444
PCI FAMILY ADAPTER 1
PCI FAMILY ADAPTER 1
486
456
480
PCI FAMILY ADAPTER 2
457
PCI FAMILY ADAPTER 2
474
468
473
478
460
SWITCH OR ROUTER
472
NETWORK
464
DIRECT ATTACHED STORAGE
476

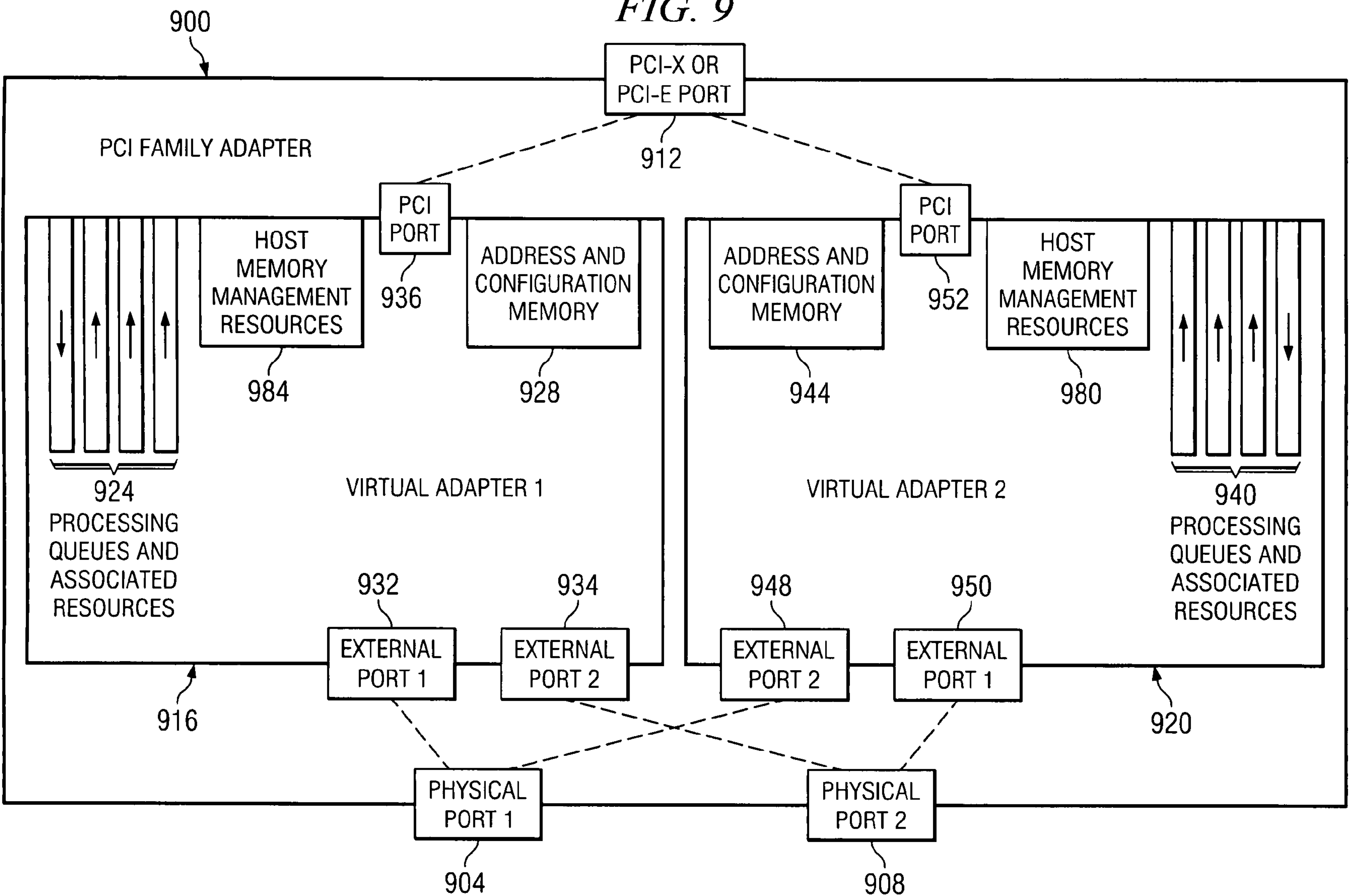
FIG. 9
900
PCI-X OR PCI-E PORT
912
PCI FAMILY ADAPTER
PCI PORT
936
PCI PORT
952
HOST MEMORY MANAGEMENT RESOURCES
984
ADDRESS AND CONFIGURATION MEMORY
928
ADDRESS AND CONFIGURATION MEMORY
944
HOST MEMORY MANAGEMENT RESOURCES
980
924
PROCESSING QUEUES AND ASSOCIATED RESOURCES
VIRTUAL ADAPTER 1
VIRTUAL ADAPTER 2
940
PROCESSING QUEUES AND ASSOCIATED RESOURCES
932
934
948
950
EXTERNAL PORT 1
EXTERNAL PORT 2
EXTERNAL PORT 2
EXTERNAL PORT 1
916
920
PHYSICAL PORT 1
PHYSICAL PORT 2
904
908

PCI PORT
1528
1504
BDF 1
1526
1506
PCI ADAPTER
1532
BDF N
1510
2
VIRTUAL
ADAPTER 1
1508
1
VP 1
VP 2
VP 3
VP 4
VP N
ADDRESS
TPT
1511
VERB
MEMORY TPT
1512
1516
1524
1514
1518
PHYSICAL
PORT 1
PHYSICAL
PORT 2
1522

PCI PORT
1678
1694
BDF 1
1692
PCI ADAPTER
1674
BDF N
1688
2
1690
1
VP 1
VP 2
VP 3
VP 4
VP N
ADDRESS TPT
1675
VERB MEMORY TPT
1676
PHYSICAL PORT 1
PHYSICAL PORT 2

HOST MEMORY
1798
LMB 1
1786
1794
APPLICATION 1
VA SPACE
LMB 2
1784
SYSTEM IMAGE A
(LA SPACE)
1796
1782
LMB 3
1792
APPLICATION 1
VA SPACE
LMB 4
1780
HYPERVISOR
APPLICATION 2
VA SPACE
1790
1768
I/O ASIC
LMB N
1778
1532
PHYSICAL PCI PORTS
1504
BDF 1
1528
VIRTUAL
PCI PORT
1514
1510
BDF N
1526
2
1511
1506
1512
PCI
BUS
ATPT
VERB
MEMORY
TPT
1
VP 1
VP 2
VP 3
VP 4
VP N
1516
1524
1518
1522
1508
VIRTUAL ADAPTER 1
PCI ADAPTER
PHYSICAL PORT 1
PHYSICAL PORT 2
1694
1674
1678
1692
HOST
PCI PORT
1688
1675
1676
1690
PCI ADAPTER

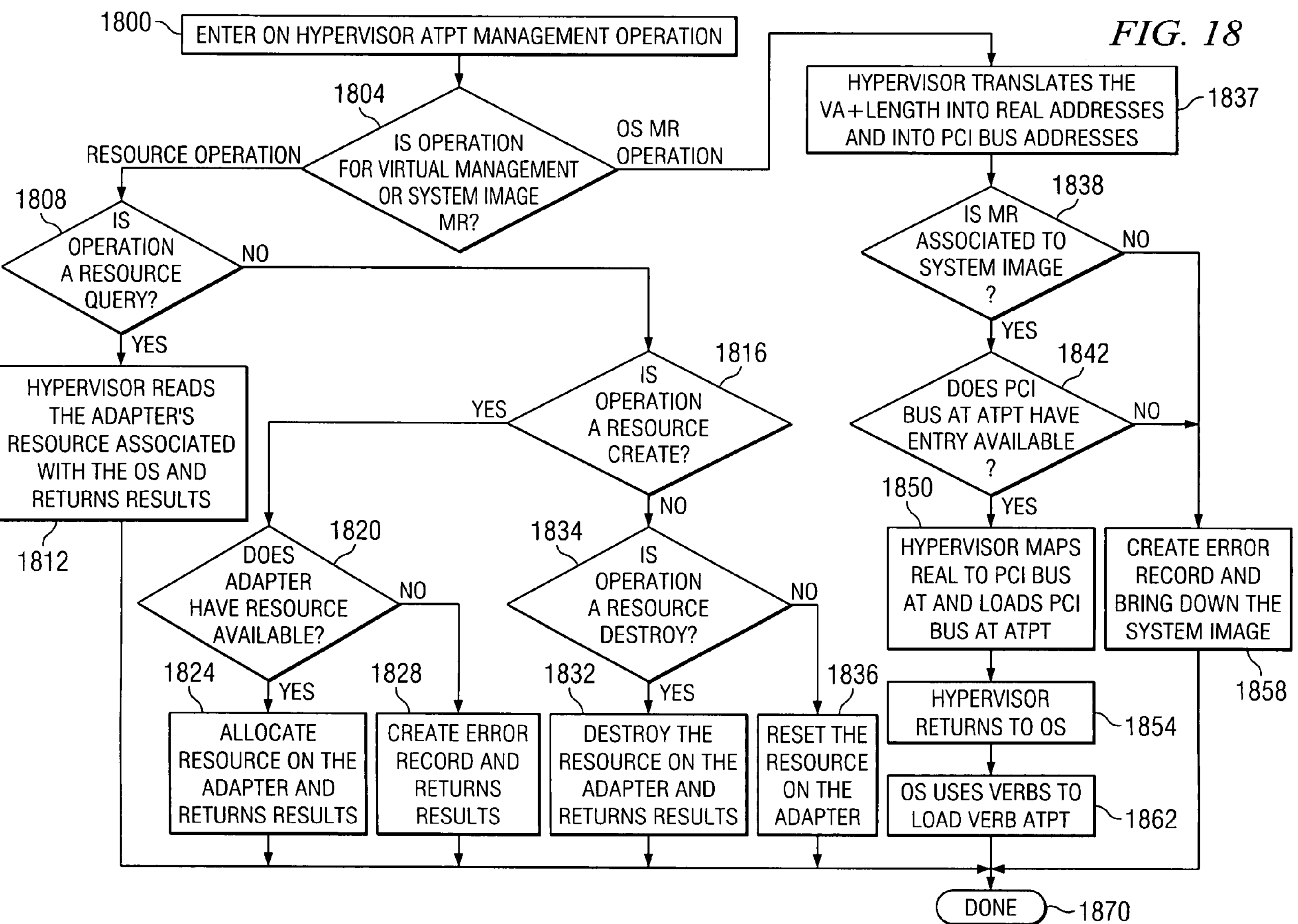
FIG. 18
1800
ENTER ON HYPERVISOR ATPT MANAGEMENT OPERATION
1804
IS OPERATION FOR VIRTUAL MANAGEMENT OR SYSTEM IMAGE MR?
RESOURCE OPERATION
OS MR OPERATION
1808
IS OPERATION A RESOURCE QUERY?
YES
NO
1812
HYPERVISOR READS THE ADAPTER'S RESOURCE ASSOCIATED WITH THE OS AND RETURNS RESULTS
1816
IS OPERATION A RESOURCE CREATE?
YES
NO
1820
DOES ADAPTER HAVE RESOURCE AVAILABLE?
YES
NO
1824
ALLOCATE RESOURCE ON THE ADAPTER AND RETURNS RESULTS
1828
CREATE ERROR RECORD AND RETURNS RESULTS
1834
IS OPERATION A RESOURCE DESTROY?
YES
NO
1832
DESTROY THE RESOURCE ON THE ADAPTER AND RETURNS RESULTS
1836
RESET THE RESOURCE ON THE ADAPTER
1837
HYPERVISOR TRANSLATES THE VA+LENGTH INTO REAL ADDRESSES AND INTO PCI BUS ADDRESSES
1838
IS MR ASSOCIATED TO SYSTEM IMAGE ?
YES
NO
1842
DOES PCI BUS AT ATPT HAVE ENTRY AVAILABLE ?
YES
NO
1850
HYPERVISOR MAPS REAL TO PCI BUS AT AND LOADS PCI BUS AT ATPT
1854
HYPERVISOR RETURNS TO OS
1858
CREATE ERROR RECORD AND BRING DOWN THE SYSTEM IMAGE
1862
OS USES VERBS TO LOAD VERB ATPT
1870
DONE

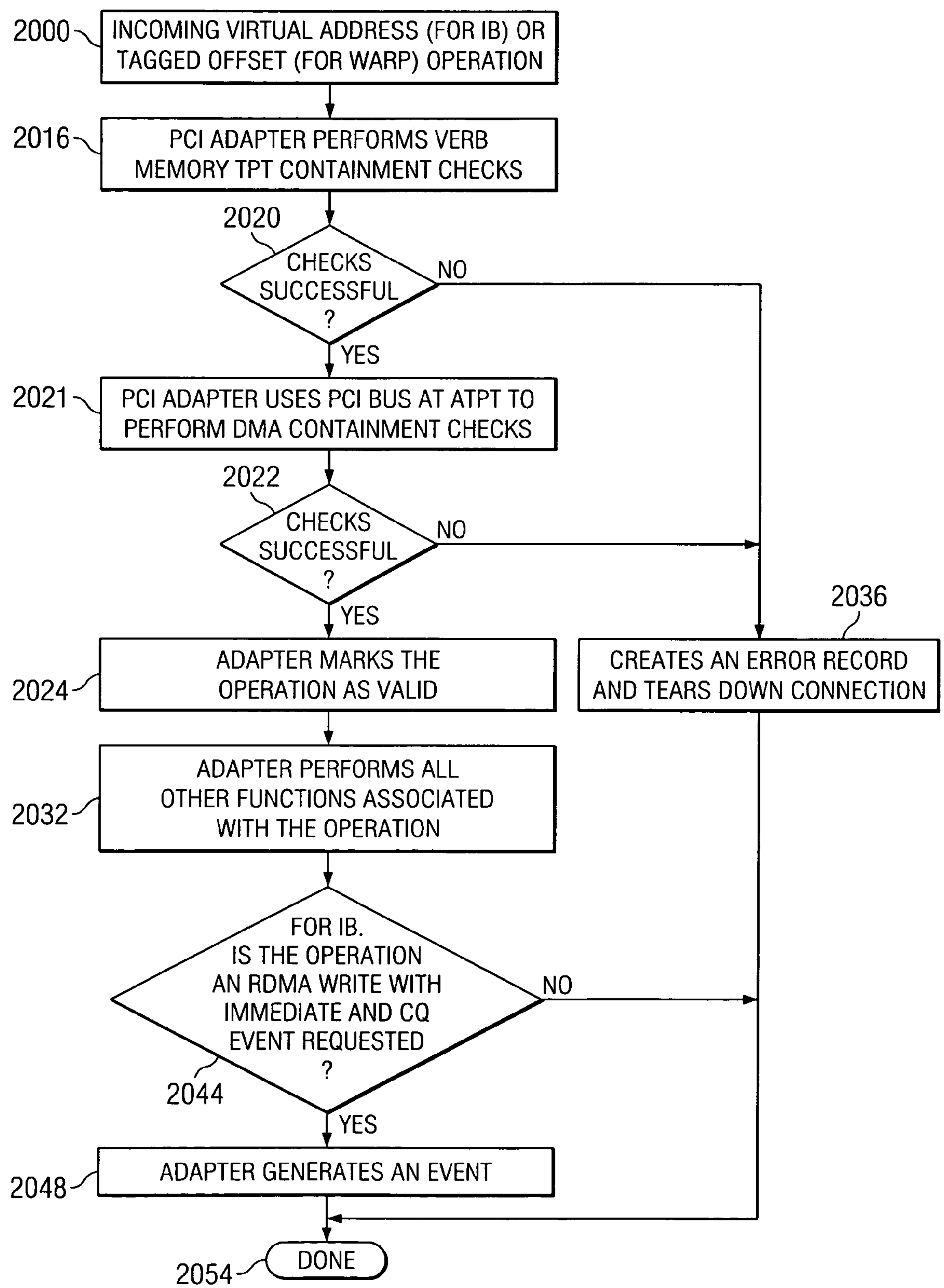
FIG. 20
2000
INCOMING VIRTUAL ADDRESS (FOR IB) OR TAGGED OFFSET (FOR WARP) OPERATION
2016
PCI ADAPTER PERFORMS VERB MEMORY TPT CONTAINMENT CHECKS
2020
CHECKS SUCCESSFUL ?
NO
YES
2021
PCI ADAPTER USES PCI BUS AT ATPT TO PERFORM DMA CONTAINMENT CHECKS
2022
CHECKS SUCCESSFUL ?
NO
YES
2036
CREATES AN ERROR RECORD AND TEARS DOWN CONNECTION
2024
ADAPTER MARKS THE OPERATION AS VALID
2032
ADAPTER PERFORMS ALL OTHER FUNCTIONS ASSOCIATED WITH THE OPERATION
FOR IB. IS THE OPERATION AN RDMA WRITE WITH IMMEDIATE AND CQ EVENT REQUESTED ?
NO
2044
YES
2048
ADAPTER GENERATES AN EVENT
2054
DONE

METHOD, SYSTEM AND PROGRAM PRODUCT FOR DIFFERENTIATING BETWEEN VIRTUAL HOSTS ON BUS TRANSACTIONS AND ASSOCIATING ALLOWABLE MEMORY ACCESS FOR AN INPUT/OUTPUT ADAPTER THAT SUPPORTS VIRTUALIZATION

CROSS-REFERENCE TO RELATED APPLICATIONS

This application is related to commonly assigned and co-pending U.S. patent application Ser. No. 11/066,645 entitled "Virtualized I/O Adapter for a Multi-Processor Data Processing System"; U.S. patent application Ser. No. 11/065,869 entitled "Virtualized Fibre Channel Adapter for a Multi-Processor Data Processing System"; U.S. patent application Ser. No. 11/065,951 entitled "Interrupt Mechanism on an I/O Adapter That Supports Virtualization"; U.S. patent application Ser. No. 11/066,201 entitled "System and Method for Modification of Virtual Adapter Resources in a Logically Partitioned Data Processing System"; U.S. patent application Ser. No. 11/065,818 entitled "Method, System, and Computer Program Product for Virtual Adapter Destruction on a Physical Adapter that Supports Virtual Adapters"; U.S. patent application Ser. No. 11/066,518 entitled "System and Method of Virtual Resource Modification on a Physical Adapter that Supports Virtual Resources"; U.S. patent application Ser. No. 11/066,096 entitled "System and Method for Destroying Virtual Resources in a Logically Partitioned Data Processing System"; U.S. patent application Ser. No. 11/066,419 entitled "Association of Memory Access Through Protection Attributes that are Associated to an Access Control Level on a PCI Adapter that Supports Virtualization"; U.S. patent application Ser. No. 11/066,931 entitled "Association of Host Translations that are Associated to an Access Control Level on a PCI Bridge that Supports Virtualization"; U.S. patent application Ser. No. 11/065,823 entitled "Method, Apparatus, and Computer Program Product for Coordinating Error Reporting and Reset Utilizing an I/O Adapter that Supports Virtualization"; U.S. patent application Ser. No. 11/068,664 entitled "Method and System for Fully Trusted Adapter Validation of Addresses Referenced in a Virtual Host Transfer Request"; U.S. patent application Ser. No. 11/066,353 entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification"; U.S. patent application Ser. No. 11/066,487 entitled "Native Virtualization on a Partially Trusted Adapter Using PCI Host Memory Mapped Input/Output Memory Address for Identification"; U.S. patent application Ser. No. 11/066,519 entitled "Native Virtualization on a Partially Trusted Adapter Using PCI Host Bus, Device, and Function Number for Identification; U.S. patent application Ser. No. 11/066,521 entitled "System and Method for Virtual Adapter Resource Allocation"; U.S. patent application Ser. No. 11/067,354 entitled "System and Method for Providing Quality of Service in a Virtual Adapter"; and U.S. patent application Ser. No. 11/066,590 entitled "System and Method for Managing Metrics Table Per Virtual Port in a Logically Partitioned Data Processing System" all of which are hereby incorporated by reference.

BACKGROUND OF THE INVENTION

1. Technical Field

The present invention relates generally to communication protocols between a host computer and an input/output (I/O) adapter. More specifically, the present invention provides an implementation for virtualizing resources on a physical I/O. In particular, the present invention provides a mechanism by which the combination of a PCI Bus address translation and protection table and a verb, such as InfiniBand verbs or RDMA protocol verbs, memory address translation and protection table can be used to associate a system image to a set of system memory addresses, such that a system image within a multiple system image virtual server can, with safety, directly expose a portion, or all, of its associated system memory to a PCI adapter that is shared by multiple system images. "With safety" in the previous sentence means that the system memory exposed by one system image is protected from access due to either the intentional or erroneous operation of the other system images sharing the PCI adapter.

2. Description of Related Art

Virtualization is the creation of substitutes for real resources. The substitutes have the same functions and external interfaces as their real counterparts, but differ in attributes such as size, performance, and cost. These substitutes are virtual resources and their users are usually unaware of the substitute's existence. Servers have used two basic approaches to virtualize system resources: partitioning and logical partition (LPAR) managers. Partitioning creates virtual servers as fractions of a physical server's resources, typically in coarse (e.g. physical) allocation units (e.g. a whole processor, along with its associated memory and I/O adapters). LPAR managers, sometimes referred to as hypervisors, are software or firmware components that can virtualize all server resources with fine granularity (e.g. in small fractions that of a single physical resource).

Prior to this invention, servers that support virtualization had two options for handling I/O. The first option was to not allow a single physical I/O adapter to be shared between virtual servers. The second option was to add function into the LPAR manager, or another intermediary, that provides the isolation necessary to permit multiple operating systems to share a single physical adapter.

The first option has several problems. One significant problem is that expensive adapters cannot be shared between virtual servers. If a virtual server only needs to use a fraction of an expensive adapter, an entire adapter would be dedicated to the server. As the number of virtual servers on the physical server increases, this leads to underutilization of the adapters and more importantly a more expensive solution, because each virtual server needs a physical adapter dedicated to it. For physical servers that support many virtual servers, another significant problem with this option is that it requires many adapter slots, with all the accompanying hardware (e.g. chips, connectors, cables, etc. . . ) required to attach those adapters to the physical server.

Though the second option provides a mechanism for sharing adapters between virtual servers, that mechanism must be invoked and executed on every I/O transaction. The invocation and execution of the sharing mechanism by the LPAR manager or other intermediary on every I/O transaction degrades performance. It also leads to a more expensive solution, because the customer must purchase more hardware, either to make up for the cycles used to perform the sharing mechanism or, if the sharing mechanism is offloaded to an intermediary, for the intermediary hardware.

It would be advantageous to have an improved method, apparatus, and computer instructions that allows a system image within a multiple system image virtual server to directly expose a portion, or all, of its associated system memory to a shared PCI adapter without having to go through a trusted component, such as a LPAR manager to provide isolation from the other virtual server system images. It would also be advantageous to have the mechanism apply for Ethernet NICs (Network Interface Controllers), FC (Fibre Channel) HBAs (Host Bus Adapters), PSCSI (parallel SCSI) HBAs, InfiniBand, TCP/IP Offload Engines, RDMA (Remote Direct Memory Access) enabled NICs (Network Interface Controllers), iSCSI adapters, iSER (iSCSI Extensions for RDMA) adapters, and any other type of adapter that supports a memory mapped I/O interface.

SUMMARY OF THE INVENTION

The present invention provides a method, computer program product, and distributed data processing system that allows a system image within a multiple system image virtual server to directly expose a portion, or all, of its associated system memory to a shared PCI adapter without the need for each I/O operation to be analyzed and verified by a trusted component of the LPAR manager in order to maintain isolation from the other virtual server system images.

Specifically, the present invention is directed to a mechanism for sharing conventional PCI (Peripheral Component Interconnect) I/O adapters, PCI-X I/O adapters, PCI-Express I/O adapters, and, in general, any I/O adapter that uses a memory mapped I/O interface for communications. The present invention provides a mechanism by which the combination of a PCI Bus address translation and protection table and a verb, such as InfiniBand verbs or RDMA protocol verbs, memory address translation and protection table can be used to associate a system image to a set of system memory addresses, such that a system image within a multiple system image virtual server can directly expose a portion, or all, of its associated system memory to a PCI adapter that is shared by multiple system images; while at the same time maintaining isolation of the exposed system memory from intentional or erroneous access by the other system images that share the I/O adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a diagram of a distributed computer system illustrated in accordance with a preferred embodiment of the present invention;

FIG. 2 is a functional block diagram of a small host processor node in accordance with a preferred embodiment of the present invention;

FIG. 4 is a functional block diagram of a large host processor node in accordance with a preferred embodiment of the present invention;

FIG. 9 is a diagram illustrating the adapter resources that must be virtualized in order to allow: an adapter to directly access virtual host resources; allow a virtual host to directly access adapter resources; and allow a non-PCI port on the adapter to access resources on the adapter or host in accordance with a preferred embodiment of the present invention;

FIG. 18 is a flowchart outlining the functions used to manage the adapter's address translations and protection tables;

FIG. 20 is a flowchart outlining the functions performed at run-time to validate the memory access of an inbound operation on an adapter downstream port.

DETAILED DESCRIPTION OF THE PREFERRED EMBODIMENT

Figures 3, 5:
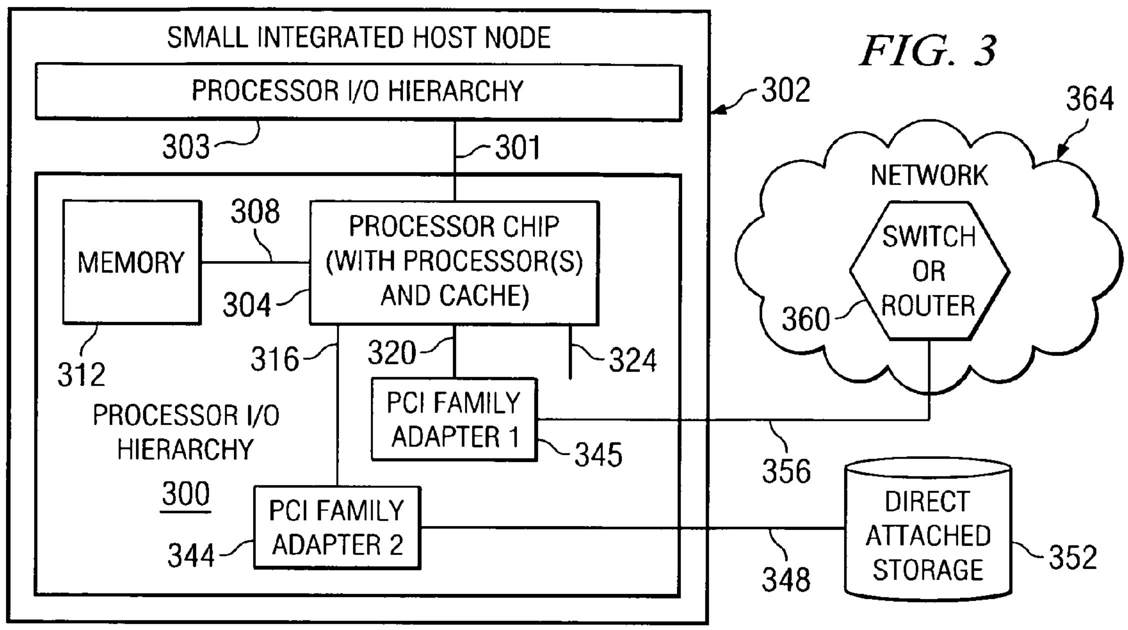
FIG. 3 is a functional block diagram of a small, integrated host processor node in accordance with a preferred embodiment of the present invention.
FIG. 5 is a diagram illustrating the key elements of the parallel Peripheral Computer Interface (PCI) bus protocol in accordance with a preferred embodiment of the present.

The present invention applies to any general or special purpose host that uses an I/O adapter, and in the preferred embodiment the I/O adapter is a PCI family I/O adapter that is used to directly attach storage or to attach to a network, where the network consists of endnodes, switches, router and the links interconnecting these components. The network links can be Fibre Channel, Ethernet, InfiniBand, Advanced Switching Interconnect, or a proprietary link that uses proprietary or standard protocols.

With reference now to the figures and in particular with reference to FIG. 1, a diagram of a distributed computer system is illustrated in accordance with a preferred embodiment of the present invention. The distributed computer system represented in FIG. 1 takes the form of a network, such as network 120 and is provided merely for illustrative purposes and the embodiments of the present invention described below can be implemented on computer systems of numerous other types and configurations. Two switches (or routers) are shown inside of network 120, switch 116 and switch 140, switch 116 connects to a Small Host Node, such as Small Host Node 100 through a port, such as port 112. Small Host Node 100 also contains a second type of port, port 104, which connects to a Direct Attached Storage subsystem, such as Direct Attached Storage 108.

Network 120 can also attach a Large Host Node, such as Large Host Node 124, which is connected to Network 120, through port 136 which attaches to switch 140. Large Host Node 124 can also contain a second type of port, such as port 128, which connects to a Direct Attached Storage subsystem, such as Direct Attached Storage 132.

Network 120 can also attach a Small Integrated Host Node, such as Small Integrated Host Node 144, which is connected to Network 120, through port 148 which attaches to switch 140. Small Integrated Host Node 144 can also contain a second type of port, such as port 152, which connects to a Direct Attached Storage subsystem, such as Direct Attached Storage 156.

Turning next to FIG. 2, a functional block diagram of a Small Host Node is depicted in accordance with a preferred embodiment of the present invention. Small Host Node 202 is an example of a host processor node, such as Small Host Node 100 in FIG. 1.

In this example, Small Host Node 202, shown in FIG. 2, includes two Processor I/O Hierarchies, such as Processor I/O Hierarchy 200 and 203, which are interconnected through link 201. In FIG. 2 Processor I/O Hierarchy 200 is drawn completely, and it includes a Processor Chip, such as Processor Chip 207, which includes one or more processors and their associated caches. Processor Chip 207 is connected to memory, such as memory 212, through a link, such as link 208. One of the links on the Processor Chip, such as link 220, connects to a PCI Family I/O Bridge, such as PCI Family I/O Bridge 228. The PCI Family I/O Bridge 228 has one or more PCI family (PCI, PCI-X, PCI-Express, or any future generation of PCI) links that are used to connect other PCI family I/O bridges or a PCI family I/O adapter, such as PCI Family Adapter 1 244 and PCI Family Adapter 2 245 through a PCI link, such as link 232, 236, and 240. PCI Family Adapter 1 245 can also be used to connect a network, such as Network 264, through a link, such as 256, using either a Switch or Router, such as Switch Or Router 260. PCI Family Adapter 2 244 can be used to connect Direct Attached Storage, such as Direct Attached Storage 252, through a link, such as link 248.

With reference now to FIG. 3, a functional block diagram of a Small Integrated Host Node is depicted in accordance with a preferred embodiment of the present invention. Small Integrated Host Node 302 is an example of a host processor node, such as Small Integrated Host Node 144 in FIG. 1.

In this example, Small Integrated Host Node 302, shown in FIG. 3, includes two Processor I/O Hierarchies, such as Processor I/O Hierarchy 300 and 303, which are interconnected through link 301. In FIG. 3 Processor I/O Hierarchy 300 is drawn completely, and it includes a Processor Chip, such as Processor Chip 304, which includes one or more processors and their associated caches. Processor Chip 304 is connected to memory, such as memory 312, through a link, such as link 308. The Processor Chip 304 has one or more PCI family (PCI, PCI-X, PCI-Express, or any future generation of PCI) links that are used to connect either PCI family I/O bridges or a PCI family I/O adapter, such as PCI Family Adapter 1 345 and PCI Family Adapter 2 344 through a PCI link, such as link 316, 330, and 324. PCI Family Adapter 1 345 can also be used to connect a network, such as Network 364, through a link, such as 356, using either a Switch or Router, such as Switch Or Router 360. PCI Family Adapter 2 344 can be used to connect Direct Attached Storage, such as Direct Attached Storage 352, through a link, such as link 348.

Turning now to FIG. 4, a functional block diagram of a Large Host Node is depicted in accordance with a preferred embodiment of the present invention. Large Host Node 402 is an example of a host processor node, such as Large Host Node 124 in FIG. 1.

In this example, Large Host Node 402, shown in FIG. 4, includes two Processor I/O Hierarchies, such as Processor I/O Hierarchy 400 and 403, which are interconnected through link 401. In FIG. 4 Processor I/O Hierarchy 400 includes a Processor Chip, such as Processor Chip 404, which includes one or more processors and their associated caches. Processor Chip 404 is connected to memory, such as memory 412, through a link, such as link 408. One of the links on the Processor Chip, such as link 440, connects to a PCI Family I/O Hub, such as PCI Family I/O Hub 441. The PCI Family I/O Hub uses a network, such as Network 442, to attach to a PCI Family I/O Bridge, such as PCI Family I/O Bridge 448. That is, PCI Family I/O Bridge 448 is connected to Switch or Router 436 through link 432 and Switch or Router 436 also attaches to PCI Family I/O Hub 441 through link 443. Network 442 allows the PCI Family I/O Hub and PCI Family I/O Bridge to be placed in different packages. PCI Family I/O Bridge 448 has one or more PCI family (PCI, PCI-X, PCI-Express, or any future generation of PCI) links that are used to connect other PCI family I/O bridges or a PCI family I/O adapter, such as PCI Family Adapter 456 and PCI Family Adapter 2 457 through a PCI link, such as link 444, 448, and 452. PCI Family Adapter 1 456 can be used to connect Direct Attached Storage, such as Direct Attached Storage 476, through a link, such as link 460. PCI Family Adapter 2 457 can also be used to connect a network, such as Network 464, through a link, such as 468, using either a Switch or Router, such as Switch Or Router 472.

Also shown in FIG. 4, Processor I/O Hierarchy 403 includes a Processor Chip, such as Processor Chip 405, which includes one or more processors and their associated caches. Processor Chip 405 is connected to memory, such as memory 413, through a link, such as link 409. One of the links on the Processor Chip, such as link 418, connects to a non-PCI I/O Hub, such as non-PCI I/O Hub 419. The non-PCI I/O Hub uses a network, such as Network 492, to attach to a non-PCI to PCI I/O Bridge, such as non-PCI to PCI I/O Bridge 488. That is, non-PCI to PCI I/O Bridge 488 is connected to Switch or Router 494 through link 490 and Switch or Router 494 also attaches to non-PCI I/O Hub 419 through link 496. Network 492 allows the non-PCI I/O Hub 419 and non-PCI to PCI I/O Bridge 488 to be placed in different packages. Non-PCI to PCI I/O Bridge 488 has one or more PCI family (PCI, PCI-X, PCI-Express, or any future generation of PCI) links that are used to connect other PCI family I/O bridges or a PCI family I/O adapter, such as PCI Family Adapter 1 480 and PCI Family Adapter 2 474 through a PCI link, such as link 482, 484, and 486. PCI Family Adapter 1 480 can be used to connect Direct Attached Storage, such as Direct Attached Storage 476, through a link, such as link 478. PCI Family Adapter 2 457 can also be used to connect a network, such as Network 464, through a link, such as 473, using either a Switch or Router, such as Switch Or Router 472.

Turning next to FIG. 5, an illustration of the phases contained in a conventional PCI bus transaction, such as PCI 500, and a PCI-X bus transaction, such as PCI-X 520 is depicted in accordance with a preferred embodiment of the present invention. PCI 500 depicts the conventional PCI bus transaction that forms the unit of information which is transferred through a PCI fabric for conventional PCI. PCI-X 520 depicts the PCI-X bus transaction that forms the unit of information which is transferred through a PCI fabric for PCI-X.

PCI 500 shows three phases: an address phase, such as Address Phase 508; a data phase, such as Data Phase 512; and a turnaround cycle, such as Turnaround Cycle 516. Also depicted is the Arbitration for next transfer, 504, which can occur simultaneously with the three phases. For conventional PCI, the address contained in the Address Phase is used to route a bus transaction from the adapter to the host and from the host to the adapter.

PCI-X 520 shows five phases: an address phase, such as Address Phase 528; an attribute phase, such as Attribute Phase 532; a response phase, such as Response Phase 560; a data phase, such as Data Phase 564; and a turnaround cycle, such as Turnaround Cycle 566. Also depicted is the Arbitration for next transfer, 524, which can occur simultaneously with the three phases. Similar to conventional PCI, PCI-X uses the address contained in the Address Phase to route a bus transaction from the adapter to the host and from the host to the adapter. However, PCI-X adds the Attribute Phase 532, which contains three fields that define the bus transaction Requestor, these three fields are the: Requestor Bus Number 544, Requestor Device Number 548, and Requestor Function Number 552. The bus transaction also contains a Misc field 536, and a Tag 540 which uniquely identifies the specific bus transaction in relation to other bus transactions that are outstanding between the Requestor and the Responder. The Byte Count 556 contains a count of the number of bytes being sent.

Figure 6:
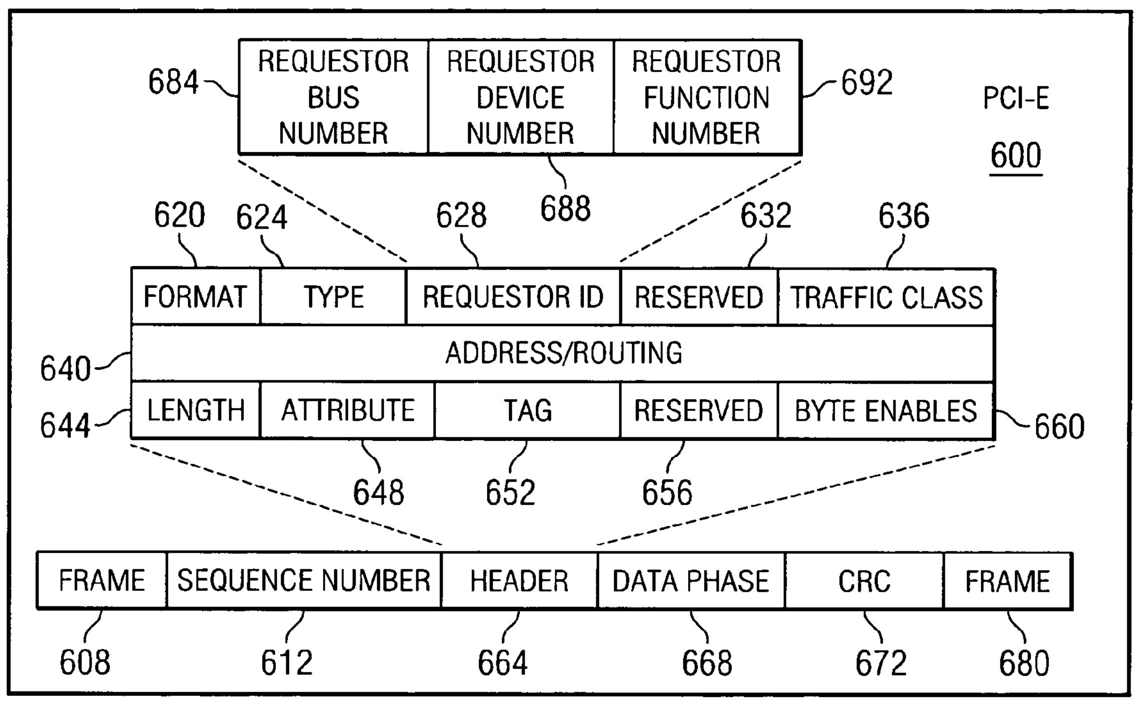
FIG. 6 is a diagram illustrating the key elements of the serial PCI bus protocol (PCI-Express, a.k.a. PCI-E) in accordance with a preferred embodiment of the present.

Turning now to FIG. 6, an illustration of the phases contained in a PCI-Express bus transaction, such as PCI-E 600 is depicted in accordance with a preferred embodiment of the present invention. The PCI-E bus transaction depicted in 600 forms the unit of information which is transferred through a PCI fabric for PCI-E.

PCI-E 600 shows six phases: a frame phase, such as Frame 608; a sequence number, such as Sequence Number 612; a header, such as Header 664; a data phase, such as Data Phase 668; a Cyclical Redundancy Check, such as CRC 672; and a frame phase, such as Frame 680. The PCI-E Header, such as Header 664, contains a set of fields defined in the PCI-Express specification, including Address/Routing information 640. The Requestor Identifier field, such as Requestor ID 628, contains three fields that define the bus transaction Requestor, these three fields are the: Requestor Bus Number 684, Requestor Device Number 688, and Requestor Function Number 692. The PCI-E Header also contains a Tag 652, which uniquely identifies the specific bus transaction in relation to other bus transactions that are outstanding between the Requestor and the Responder. The remaining Header fields, including Length 644, Attr 648, Reserved 656, Byte Enables 660, Fmt 620, Type 624, Reserved 632 and Traffic Class 636, are defined in the PCI-Express specification and need not be further described herein.

Figure 7:
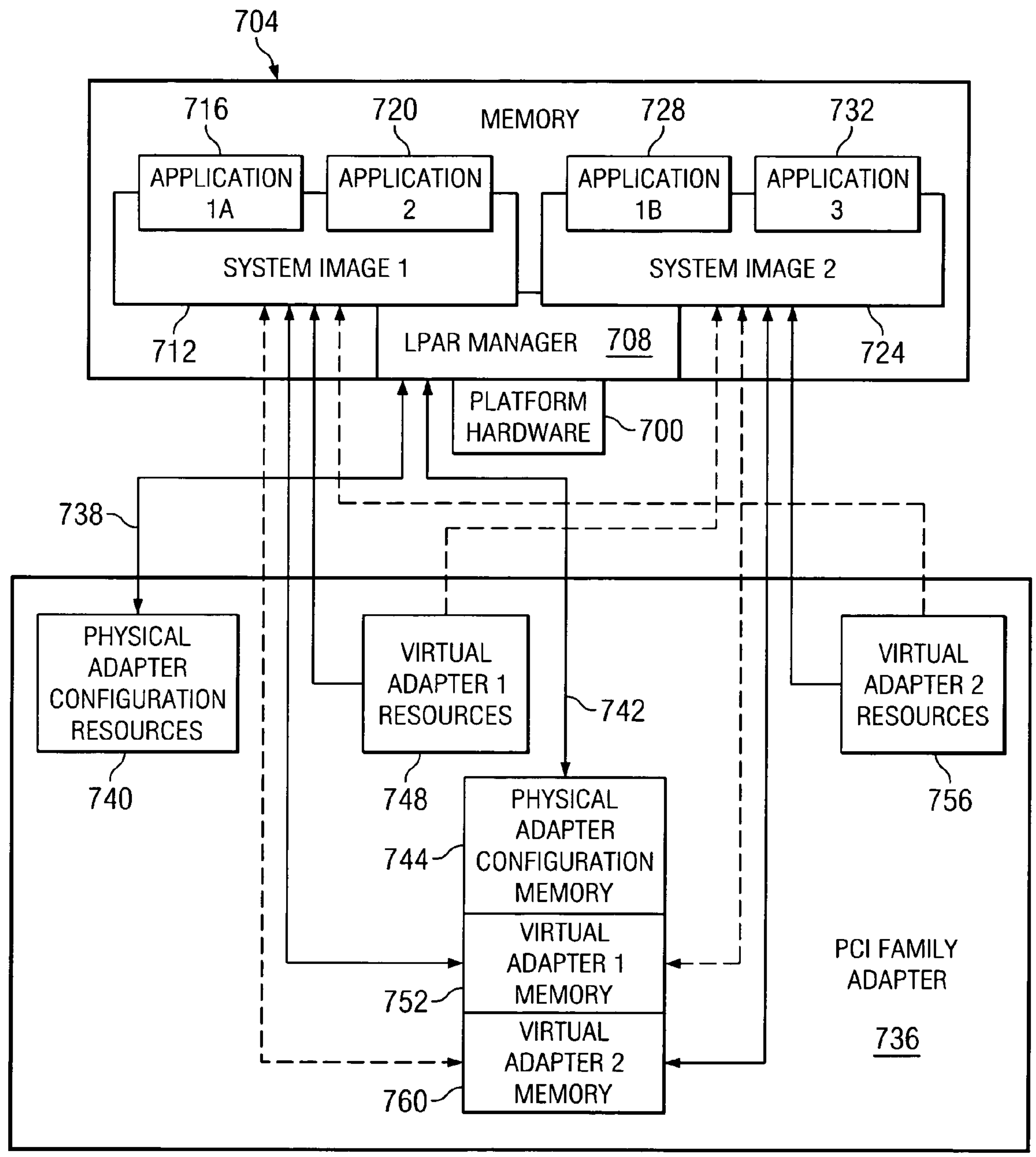
FIG. 7 is a diagram illustrating the I/O virtualization functions that must be provided in a host processor node in order to provide virtual host access isolation in accordance with the present invention.

With reference now to FIG. 7, a functional block diagram of a PCI adapter, such as PCI Family Adapter 736, and the firmware and software that runs on host hardware (e.g. processor with possibly an I/O Hub or I/O Bridge), such as Host Hardware 700, is depicted in accordance with a preferred embodiment of the present invention.

FIG. 7 also shows a LPAR manager, such as Hypervisor 708, running on Host Hardware 700. Hypervisor 708 can run in firmware, software, or a combination of the two. Hypervisor 708 hosts two System Image partitions, such as System Image 1 712 and System Image 2 724. The System Image partitions may be an Operating System running in software, a special purpose image running in software, such as a storage block server or storage file server image, or a special purpose image running in firmware. Applications can run on these System Images, such as Application 1A 716, Application 2 720, Application 1B 728, and Application 3 732.

PCI Family Adapter 736 contains a set of Physical Adapter Configuration Resources, such as Physical Adapter Configuration Resources 740, and Physical Adapter Memory Resources, such as Physical Adapter Memory Resources 744. The Physical Adapter Configuration Resources 740 and Memory 744 contain information describing the number of virtual adapters that PCI Family Adapter 736 can support and the physical resources allocated to each virtual adapter. Hypervisor 708 is provided a physical configuration resource interface, such as 738, and memory interface, such as 742, to read and write into the Physical Adapter Configuration Resource and Memory spaces during the adapter's initial configuration and reconfiguration. Through the physical configuration resource interface 738 and physical configuration memory interface 742, Hypervisor 708 creates virtual adapters and assigns physical resources to each virtual adapter. The Hypervisor 708 may use one of the System Images, for example a special software or firmware partition, as a hosting partition that uses physical configuration resource interface 738 and physical configuration memory interface 742 to perform a portion, or even all, of the virtual adapter initial configuration and reconfiguration functions.

FIG. 7 shows two Virtual Adapters. Virtual Adapter 1 contains the set of Virtual Adapter Resources, such as Virtual Adapter 1 Resources 748, and Virtual Adapter Memory, such as Virtual Adapter 1 Memory 752, that were assigned by Hypervisor 708 to Virtual Adapter 1 and associated with an System Image, such as System Image 1 712. Similarly, Virtual Adapter 2 contains the set of Virtual Adapter Resources, such as Virtual Adapter 2 Resources 756, and Virtual Adapter Memory, such as Virtual Adapter 2 Memory 760, that were assigned by Hypervisor 708 to Virtual Adapter 2 and associated with an System Image, such as System Image 2 724. For an adapter used to connect to Direct Attached Storage, such as Direct Attached Storage 108, 132, or 156 (as shown in FIG. 1), examples of Virtual Adapter Resources may include: the list of the associated physical disks, a list of the associated Logical Unit Numbers, and a list of the associated adapter functions (e.g. RAID level). For an adapter used to connect to a Network, such as Network 120 (as shown in FIG. 1), examples of Virtual Adapter Resources may include: the list of the associated link level identifiers, a list of the associated network level identifiers, a list of the associated virtual fabric identifiers (e.g. Virtual LAN IDs for Ethernet fabrics, N-port IDs for Fibre Channel fabrics, and Partition Keys for InfiniBand fabrics), and a list of the associated network layers functions (e.g. network offload services).

After the Hypervisor 708 configures the PCI Family Adapter 736, each System Image is allowed to only communicate with the Virtual Adapters that were associated with that System Image by Hypervisor 708. As shown in FIG. 7 at 768 and 764, System Image 1 is allowed to communicate with Virtual Adapter 1 Resources 748 and Virtual Adapter 1 Memory 752 directly. FIG. 7 at 778 and 782 also shows that System Image 1 is not allowed to communicate with Virtual Adapter 2 Resources 756 and Virtual Adapter 2 Memory 760 directly. Similarly, FIG. 7 at 774 and 772 shows that System Image 2 is allowed to communicate with Virtual Adapter 2 Resources 756 and Virtual Adapter 1 Memory 760 directly. FIG. 7 at 786 and 790 also shows that System Image 2 is not allowed to communicate with Virtual Adapter 1 Resources 748 and Virtual Adapter 1 Memory 752 directly.

Figure 8:
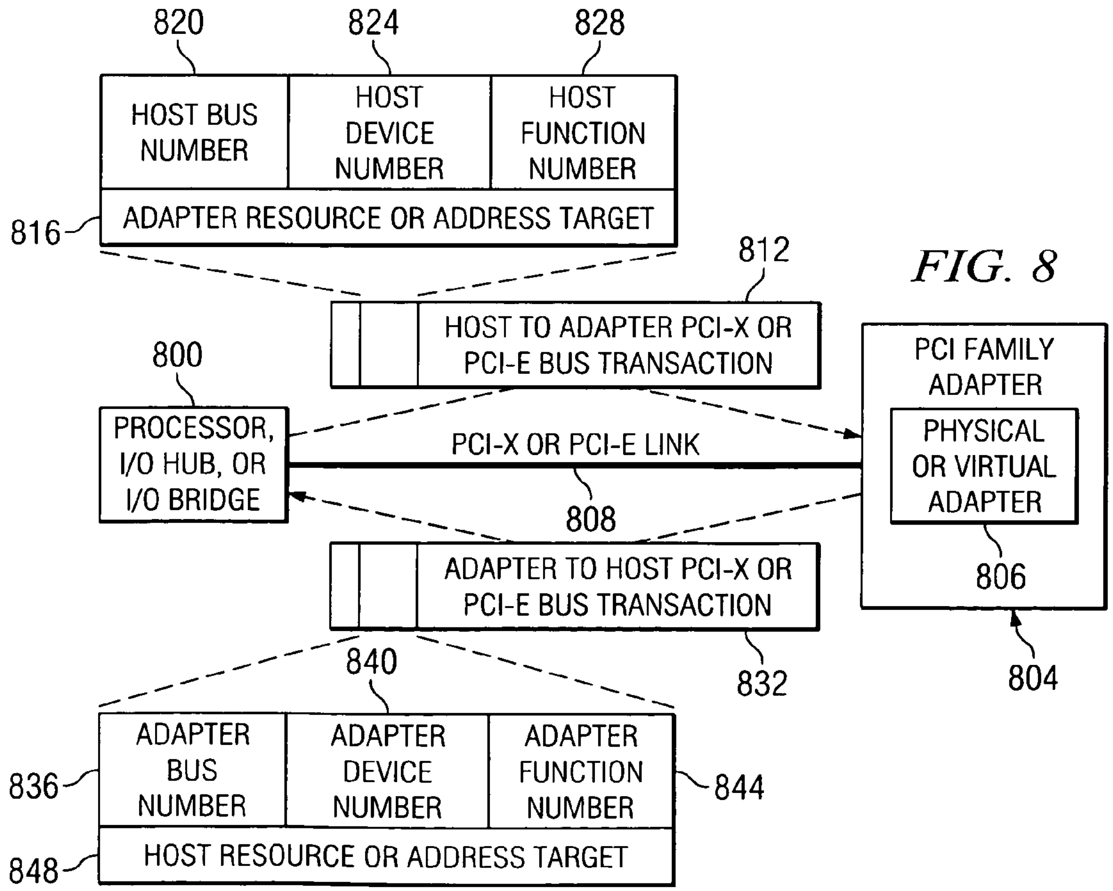
FIG. 8 is a diagram illustrating the control fields used in the PCI Bus Transaction to identify a virtual adapter or system image in accordance with a preferred embodiment of the present invention.

With reference now to FIG. 8, there is depicted a component, such as Processor, I/O Hub, or I/O Bridge 800, inside a host node, such as Small Host Node 100, Large Host Node 124, or Small, Integrated Host Node 144, that attaches a PCI Family Adapter, such as PCI Family Adapter 804, through a PCI-X or PCI-E link, such as PCI-X or PCI-E Link 808 in accordance with a preferred embodiment of the present invention.

FIG. 8 shows that when a System Image, such as System Image 1 712 or System Image 2 724, or a LPAR manager, such as Hypervisor 708, performs a PCI-X or PCI-E bus transactions, such as Host to Adapter PCI-X or PCI-E Bus Transaction 812, the Processor, I/O Hub, or I/O Bridge 800 that connects to the PCI-X or PCI-E Link 808 which issues the Host to Adapter PCI-X or PCI-E Bus Transaction 812 must fill in the Bus Number, Device Number, and Function Number fields in the PCI-X or PCI-E bus transaction 812. The Processor, I/O Hub, or I/O Bridge 800 has two choices for how to fill in these three fields: it can either use the same Bus Number, Device Number, and Function Number for all software components that use the Processor, I/O Hub, or I/O Bridge 800; or it can use a different Bus Number, Device Number, and Function Number for each software component that uses the Processor, I/O Hub, or I/O Bridge 800. The software component can be a System Image, such as System Image 1 712 or System Image 2 724, or a LPAR manager, such as Hypervisor 708. It should also be noted that this invention applies not just to the PCI Family, but to any Memory Mapped I/O interface, such as HyperTransport, Rapid I/O, proprietary Memory Mapped I/O interfaces, or some new standard Memory Mapped I/O interface.

If the Processor, I/O Hub, or I/O Bridge 800 uses the same Bus Number, Device Number, and Function Number for all software components, then when a software component initiates a PCI-X or PCI-E bus transaction, such as Host to Adapter PCI-X or PCI-E Bus Transaction 812, the Processor, I/O Hub, or I/O Bridge 800 places the Processor, I/O Hub, or I/O Bridge's bus number in the PCI-X or PCI-E bus transaction's Requestor Bus Number, such as Requestor Bus Number 544 or Requestor Bus Number 684. This is shown in FIG. 8 as Host Bus Number 820. Similarly, the Processor, I/O Hub, or I/O Bridge 800 places the Processor, I/O Hub, or I/O Bridge's device number in the PCI-X or PCI-E bus transaction's Requestor Device Number, such as Requestor Bus Number 548 or Requestor Device Number 688. This is shown in FIG. 8 as Host Device Number 824. Finally, the Processor, I/O Hub, or I/O Bridge 800 places the Processor, I/O Hub, or I/O Bridge's function number in the PCI-X or PCI-E bus transaction's Requestor Function Number, such as Requestor Bus Number 552 or Requestor Function Number 692. This is shown in FIG. 8 as Host Function Number 828. The Processor, I/O Hub, or I/O Bridge 800 also places in the PCI-X or PCI-E bus transaction the Physical or Virtual Adapter memory address that is targeted by the software component. This is shown in FIG. 8 as Adapter Resource or Address 816.

If the Processor, I/O Hub, or I/O Bridge 800 uses a different Bus Number, Device Number, and Function Number for each software component, then the Processor, I/O Hub, or I/O Bridge 800 must assign a Bus Number, Device Number, and Function Number to the software component. When the software component initiates a PCI-X or PCI-E bus transaction, such as Host to Adapter PCI-X or PCI-E Bus Transaction 812, the Processor, I/O Hub, or I/O Bridge 800 places the software component's bus number in the PCI-X or PCI-E bus transaction's Requestor Bus Number, such as Requestor Bus Number 544 or Requestor Bus Number 684. This is shown in FIG. 8 as Host Bus Number 820. Similarly, the Processor, I/O Hub, or I/O Bridge 800 places the software component's device number in the PCI-X or PCI-E bus transaction's Requestor Device Number, such as Requestor Bus Number 548 or Requestor Device Number 688. This is shown in FIG. 8 as Host Device Number 824. Finally, the Processor, I/O Hub, or I/O Bridge 800 places the software component's function number in the PCI-X or PCI-E bus transaction's Requestor Function Number, such as Requestor Bus Number 552 or Requestor Function Number 692. This is shown in FIG. 8 as Host Function Number 828. The Processor, I/O Hub, or I/O Bridge 800 also places in the PCI-X or PCI-E bus transaction the Physical or Virtual Adapter memory address that is targeted by the software component. This is shown in FIG. 8 as Adapter Resource or Address 816.

FIG. 8 also shows that when a physical or virtual adapter, such as Physical or Virtual Adapter 806 performs PCI-X or PCI-E bus transactions, such as Adapter to Host PCI-X or PCI-E Bus Transaction 832, the PCI Family Adapter, such as Physical Family Adapter 804, that connects to the PCI-X or PCI-E Link 808 which issues the Adapter to Host PCI-X or PCI-E Bus Transaction 832 must fill in the Bus Number, Device Number, and Function Number of the associated bus transaction with the Physical or Virtual Adapter that initiated the bus transaction. It should be noted that to support more than one Bus or Device Number, PCI Family Adapter 804 must support one or more internal busses (For a PCI-X Adapter, see the PCI-X Addendum to the PCI Local Bus Specification Revision 1.0 or 1.0a; for a PCI-E Adapter see PCI-Express Base Specification Revision 1.0 or 1.0a). Also, to perform this function, Hypervisor 708 associates each Physical or Virtual Adapter to a software component running, by assigning a Bus Number, Device Number, and Function Number to the Physical or Virtual Adapter. When the Physical or Virtual Adapter initiates an Adapter to Host PCI-X or PCI-E Bus Transaction, the PCI Family Adapter 804 places the Physical or Virtual Adapter's bus number in the PCI-X or PCI-E bus transaction's Requestor Bus Number, such as Requestor Bus Number 544 or Requestor Bus Number 684. This is shown in FIG. 8 as Adapter Bus Number 836. Similarly, PCI Family Adapter 804 places the Physical or Virtual Adapter's device number in the PCI-X or PCI-E bus transaction's Requestor Device Number, such as Requestor Bus Number 548 or Requestor Device Number 688. This is shown in FIG. 8 as Adapter Device Number 840. Finally, PCI Family Adapter 804 places the Physical or Virtual Adapter's function number in the PCI-X or PCI-E bus transaction's Requestor Function Number, such as Requestor Bus Number 552 or Requestor Function Number 692. This is shown in FIG. 8 as Adapter Function Number 844. The PCI Family Adapter 804 also places in the PCI-X or PCI-E bus transaction the memory address of the system storage assigned to the software component that is associated with, and targeted by, the Physical or Virtual Adapter. This is shown in FIG. 8 as Host Resource or Address 848.

With reference now to FIG. 9, a functional block diagram of a PCI adapter, such as PCI Family Adapter 900, with two virtual adapters, such as Virtual Adapter 1 916 and Virtual Adapter 2 920, is depicted in accordance with a preferred embodiment of the present invention. A PCI adapter, such as PCI Family Adapter 900, may contain one (or more) PCI family ports, such as PCI-X or PCI-E Port 912. A PCI adapter, such as PCI Family Adapter 900, may also contain one (or more) device or network ports, such as Physical Port 1 904 and Physical Port 2 908.

FIG. 9 also shows the types of resources that can be virtualized on a PCI adapter, such as PCI Family Adapter 900. The resources on Virtual Adapter 1 916 that may be virtualized include: processing queues, such as Processing Queues 924, address and configuration memory, such as Address and Configuration Memory 928, PCI ports, such as PCI Port 936, host memory management resources (e.g. such as memory region registration and memory window binding resources on InfiniBand or iWARP), such as Host Memory Management Resources 984, and device or network ports, such as External Port 1 932 and External Port 2 934. For Virtual Adapter 2 920 the resources that may be virtualized include: processing queues, such as Processing Queues 940, address and configuration memory, such as Address and Configuration Memory 944, PCI ports, such as PCI Port 952, host memory management resources, such as Host Memory Management Resources 980, and device or network ports, such as External Port 1 948 and External Port 2 950.

Figures 10, 11:
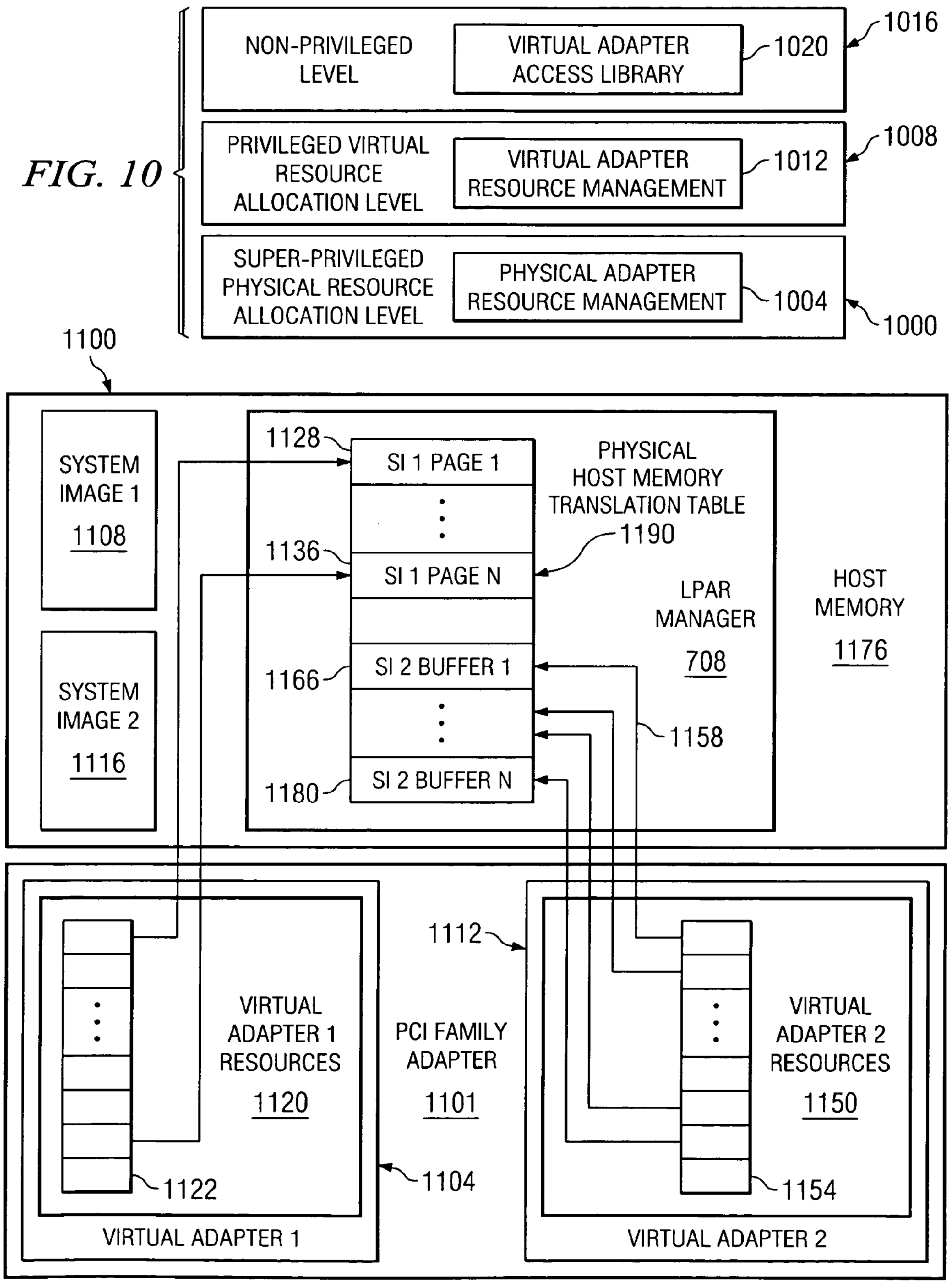
FIG. 10 is a diagram illustrating the creation of the three access control levels used to manage a PCI family adapter that supports I/O virtualization in accordance with a preferred embodiment of the present invention.
FIG. 11 is a diagram illustrating how host memory that is associated with an system image is made available to a virtual adapter that is associated with that system image through the LPAR manager in accordance with a preferred embodiment of the present invention.

Turning next to FIG. 10, a functional block diagram of the access control levels on a PCI Family Adapter, such as PCI Family Adapter 900, is depicted in accordance with a preferred embodiment of the present invention. The three levels of access are a Super-Privileged Physical Resource Allocation Level, such as Super-Privileged Physical Resource Allocation Level 1000, a Privileged Virtual Resource Allocation Level, such as Privileged Virtual Resource Allocation Level 1008, and a Non-Privileged Level, such as Non-Privileged Level 1016.

The functions performed at the Super-Privileged Physical Resource Allocation Level 1000 include: PCI Family Adapter queries, creation of virtual adapters, submission and retrieval of work, and allocation of physical resources to a virtual adapter instance. The PCI Family Adapter queries are used to determine: the physical adapter type (e.g. Fibre Channel, Ethernet, iSCSI, parallel SCSI), the functions supported on the physical adapter, and the number of virtual adapters supported by the PCI Family Adapter. A LPAR manager, such as Hypervisor 708, performs the Physical Adapter Resource Management 1004 functions associated with Super-Privileged Physical Resource Allocation Level 1000. However, the LPAR manager may use a System Image, for example an I/O Hosting Partition, to perform the Physical Adapter Resource Management 1004 functions.

The functions performed at the Privileged Virtual Resource Allocation Level 1008 include: virtual adapter queries, allocation and initialization of virtual adapter resources, submission and retrieval of work through virtual adapter resources, and, for virtual adapters that support offload services: allocation and assignment of virtual adapter resources to a middleware process or thread instance. The virtual adapter queries are used to determine: the virtual adapter type (e.g. Fibre Channel, Ethernet, iSCSI, parallel SCSI) and the functions supported on the virtual adapter. A System Image, such as System Image 1 712, performs the Privileged Virtual Adapter Resource Management 1012 functions associated with Virtual Resource Allocation Level 1008.

Finally, the functions performed at the Non-Privileged Level 1016 include: query of virtual adapter resources that have been assigned to software running at the Non-Privileged Level 1016 and submission and retrieval of work through virtual adapter resources that have been assigned to software running at the Non-Privileged Level 1016. An application, such as Application 1A 716, performs the Virtual Adapter Access Library 1020 functions associated with Non-Privileged Level 1016.

Turning next to FIG. 11, a functional block diagram of the host memory addresses that are made accessible to a PCI Family Adapter, such as PCI Family Adapter 1101, is depicted in accordance with a preferred embodiment of the present invention.

FIG. 11 depicts four different mechanisms by which a LPAR manager, such as Hypervisor 1190 can associate Host Memory 1176 assigned to a System Image, such as System Image 1 1108 or System Image 2 1116, with a Virtual Adapter, such as Virtual Adapter 1 1104 or Virtual Adapter 2 1112. Once Host Memory has been associated to a System Image and a Virtual Adapter, the Virtual Adapter can then perform Direct Memory Access (DMA) Write and Read operations directly to/from the Host Memory 1176.

The first mechanism that Hypervisor 1190 can use to associate and make available Host Memory to a System Image and to one or more Virtual Adapters is to write into the Virtual Adapter's Resources a page size and page list 1122. In FIG. 11, Virtual Adapter 1 Resources 1120 contains a list of PCI Bus Addresses, where each PCI Bus Address in the list is associated by the Platform Hardware to the starting address of a System Image page, such as SI 1 Page 1 1128 through SI 1 Page N 1136. Virtual Adapter 1 Resources 1120 also contains the page size, which must be equal for all the pages in the list. At initial configuration, and during reconfigurations, Hypervisor 1190 loads the page size and page list 1122 into the Virtual Adapter 1 Resources 1120. The page size and page list 1122 define the set of addresses (as indicated at 1124 and 1132) that Virtual Adapter 1 1104 can use in Direct Memory Access (DMA) Write and Read Operations. After the page size and page list 1122 have been created, Virtual Adapter 1 1104 must validate that each DMA Write or DMA Read requested by System Image 1 1108 is contained within a page in the page size and page list 1122. If the DMA Write or DMA Read requested by System Image 1 1108 is contained within a page in the page size and page list 1122, then Virtual Adapter 1 1104 may perform the operation. Otherwise Virtual Adapter 1 1104 must not perform the operation. Instead of Virtual Adapter 1 1104, the PCI Family Adapter 1101 may use a special, LPAR manager style Virtual Adapter to perform the check that determines if DMA Write or DMA Read requested by System Image 1 1108 is contained within a page in the page size and page list 1122.

The second mechanism that Hypervisor 1190 can use to associate and make available Host Memory to a System Image and to one or more Virtual Adapters is to write into the Virtual Adapter's Resources a starting page address and page size 1122 for a single page. In FIG. 11, Virtual Adapter 1 Resources 1120 contains a single PCI Bus Address that is associated by the Platform Hardware to the starting address of a System Image page, such as SI 1 Page 1 1128. Virtual Adapter 1 Resources 1120 also contains the size of the page. At initial configuration, and during reconfigurations, Hypervisor 1190 loads the page size and starting page address into starting page address and size resource 1122 into the Virtual Adapter 1 Resources 1120. The starting page address and size resource 1122 defines the set of addresses that Virtual Adapter 1 1104 can use in Direct Memory Access (DMA) Write and Read Operations. After the starting page address and size resource 1122 has been created, Virtual Adapter 1 1104 must validate that each DMA Write or DMA Read requested by System Image 1 1108 is contained within a page in starting page address and size resource 1122. If the DMA Write or DMA Read requested by System Image 1 1108 is contained within a page in the starting page address and size resource 1122, then Virtual Adapter 1 1104 may perform the operation. Otherwise Virtual Adapter 1 1104 must not perform the operation. Instead of Virtual Adapter 1 1104, the PCI Family Adapter 1101 may use a special, LPAR manager style Virtual Adapter to perform the check that determines if DMA Write or DMA Read requested by System Image 1 1108 is contained within a page in the starting page address and size resource 1122.

The third mechanism that Hypervisor 1190 can use to associate and make available Host Memory to a System Image and to one or more Virtual Adapters is to write into the Virtual Adapter's Resources a list of different sized buffers 1154. In FIG. 11, Virtual Adapter 2 Resources 1150 contains a list of PCI Bus Address pairs (starting and ending address), where each pair of PCI Bus Address in the list is associated by the Platform Hardware to a pair (starting and ending) of addresses of a System Image buffer, such as SI 2 Buffer 1 1166 through SI 1 Buffer N 1180. At initial configuration, and during reconfigurations, Hypervisor 1190 loads the buffer list of different sized buffers 1154 into the Virtual Adapter 2 Resources 1150. The list of different sized buffers 1154 defines the set of addresses (as indicated at 1158, 1162, 1172 and 1174) that Virtual Adapter 2 1112 can use in Direct Memory Access (DMA) Write and Read Operations. After the list of different sized buffers 1154 has been created, Virtual Adapter 2 1112 must validate that each DMA Write or DMA Read requested by System Image 2 1116 is contained within a buffer in list of different sized buffers 1154. If the DMA Write or DMA Read requested by System Image 2 1116 is contained within a buffer in the list of different sized buffers 1154, then Virtual Adapter 2 1112 may perform the operation. Otherwise Virtual Adapter 2 1112 must not perform the operation. Instead of Virtual Adapter 2 1112, the PCI Family Adapter 1101 may use a special, LPAR manager style Virtual Adapter to perform the check that determines if DMA Write or DMA Read requested by System Image 2 1116 is contained within a buffer in the list of different sized buffers 1154.

The fourth mechanism that Hypervisor 1190 can use to associate and make available Host Memory to a System Image and to one or more Virtual Adapters is to write into the Virtual Adapter's Resources a single starting and ending address. In FIG. 11, Virtual Adapter 2 Resources 1150 contains a single PCI Bus starting and ending address that is associated by the Platform Hardware to a pair (starting and ending) of addresses associated with a System Image buffer, such as SI 2 Buffer 1 1166. At initial configuration, and during reconfigurations, Hypervisor 1190 loads SI 2 Buffer 1's 1166 starting and ending address into the Virtual Adapter 2 Resources buffer starting and ending address resource 1154. The starting and ending address resource 1154 then defines the set of addresses that Virtual Adapter 2 1112 can use in Direct Memory Access (DMA) Write and Read Operations. After the starting and ending address resource 1154 has been created, Virtual Adapter 2 1112 must validate that each DMA Write or DMA Read requested by System Image 2 1116 is contained within the starting and ending address resource 1154. If the DMA Write or DMA Read requested by System Image 2 1116 is contained within a starting and ending address resource 1154, then Virtual Adapter 2 1112 may perform the operation. Otherwise Virtual Adapter 2 1112 must not perform the operation. Instead of Virtual Adapter 2 1112, the PCI Family Adapter 1101 may use a special, LPAR manager style Virtual Adapter to perform the check that determines if DMA Write or DMA Read requested by System Image 2 1116 is contained within a page in 1154.

Figure 12:
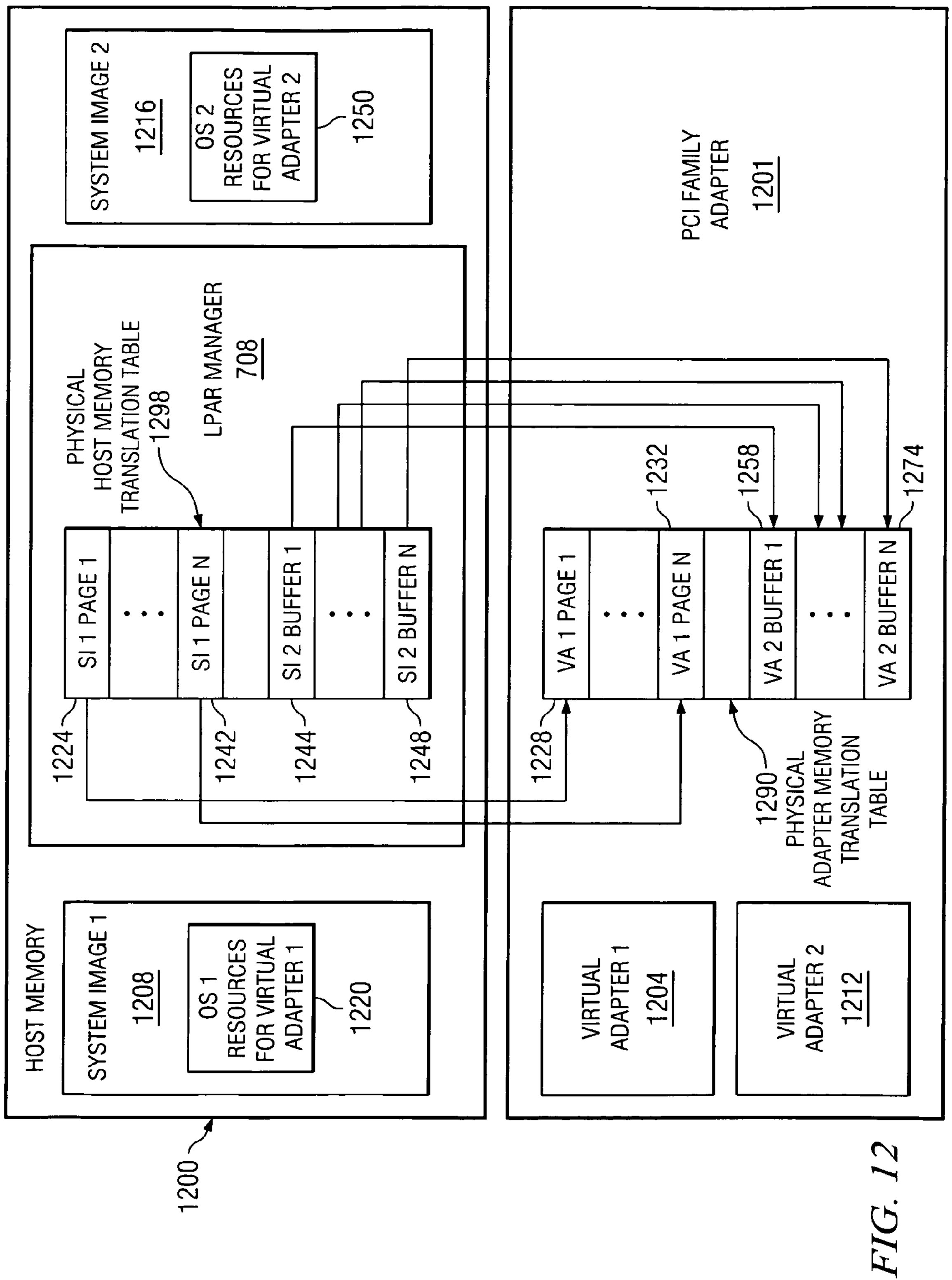
FIG. 12 is a diagram illustrating how a PCI family adapter allows the LPAR manager to associate memory in the PCI adapter to an system image and its associated virtual adapter in accordance with a preferred embodiment of the present invention.

Turning next to FIG. 12, a functional block diagram of the PCI Family Adapter, such as PCI Family Adapter 1201, memory addresses that are made accessible to a System Image, such as System Image 1 1208 or System Image 2 1216, is depicted in accordance with a preferred embodiment of the present invention.

FIG. 12 depicts four different mechanisms by which a LPAR manager, such as Hypervisor 1294 can associate PCI Family Adapter Memory to a Virtual Adapter, such as Virtual Adapter 1 1204, and to a System Image, such as System Image 1 1208. Once PCI Family Adapter Memory has been associated to a System Image and a Virtual Adapter, the System Image can then perform Programmed I/O Write and Read (a.k.a. Store and Load) operations directly to the PCI Family Adapter Memory.

There is a key difference between FIG. 11 and FIG. 12. In FIG. 11 the PCI Family Adapter only holds a list of host addresses that do not have any local memory associated with them. If the PCI Family Adapter supports flow-through traffic, then data arriving on an external port can directly flow through the PCI Family Adapter and be transferred, through DMA Writes, directly into these host addresses. Similarly, if the PCI Family Adapter supports flow-through traffic, then the data from these host addresses can directly flow through the PCI Family Adapter and be transferred out to an external port. In FIG. 12 the PCI Family Adapter has local adapter memory that is associated with the list of host memory addresses. The PCI Family Adapter can initiate: DMA Writes from its local memory to the host memory or DMA Reads from the host memory to its local memory. Similarly, the host can initiate: Programmed I/O Writes (a.k.a. Stores) from its local memory to the PCI Family Adapter memory or Programmed I/O Reads (a.k.a. Loads) from the PCI Family Adapter memory to the host's local memory.

The first and second mechanisms that Hypervisor 1294 can use to associate and make available PCI Family Adapter Memory to a System Image and to a Virtual Adapter is to write into the PCI Family Adapter's Physical Adapter Memory Translation Table 1290 a page size and the starting address of one (first mechanism) or more (second mechanism) pages. In this case all pages have the same size. For example, FIG. 12 depicts a set of pages that have been mapped (as indicated at 1224 and 1232) between the System Image 1 1208 and Virtual Adapter 1 1204: SI 1 Page 1 1240 through SI 1 Page N 1242. For System Image 1, all pages in the list have the same size. At initial configuration, and during reconfigurations, Hypervisor 1294 loads the PCI Family Adapter's Physical Adapter Memory Translation Table 1290 with the page size and the starting address of one or more pages. The Physical Adapter Memory Translation Table 1290 then defines the set of addresses that Virtual Adapter 1 1204 can use in Direct Memory Access (DMA) Write and Read Operations. After Physical Adapter Memory Translation Table 1290 has been created, PCI Family Adapter 1201 (or Virtual Adapter 1 1204) must validate that each DMA Write or DMA Read requested by System Image 1 1208 is contained in the Physical Adapter Memory Translation Table 1290 and associated with Virtual Adapter 1 1204. If the DMA Write or DMA Read requested by System Image 1 1208 is contained in the Physical Adapter Memory Translation Table 1290 and associated with Virtual Adapter 1 1204, then Virtual Adapter 1 1204 may perform the operation. Otherwise Virtual Adapter 1 1204 must not perform the operation. The Physical Adapter Memory Translation Table 1290 also defines the set of addresses that System Image 1 1208 can use in Programmed I/O (PIO) Write and Read Operations. After Physical Adapter Memory Translation Table 1290 has been created, PCI Family Adapter 1201 (or Virtual Adapter 1 1204) must validate that Programmed I/O Write or Read requested by System Image 1 1208 is contained in the Physical Adapter Memory Translation Table 1290 and associated with Virtual Adapter 1 1204. If the PIO Write or PIO Read requested by System Image 1 1208 is contained in the Physical Adapter Memory Translation Table 1290 associated with Virtual Adapter 1 1204, then Virtual Adapter 1 1204 may perform the operation. Otherwise Virtual Adapter 1 1204 must not perform the operation.

The third and fourth mechanisms that Hypervisor 1294 can use to associate and make available PCI Family Adapter Memory to a System Image and to a Virtual Adapter is to write into the PCI Family Adapter's Physical Adapter Memory Translation Table 1290 one (third mechanism) or more (fourth mechanism) buffer starting and ending addresses (or starting address and length). In this case, the buffers may have different sizes. For example, FIG. 12 depicts a set of varying sized buffers that have been mapped (as indicated at 1258, 1262, 1270 and 1274) between the System Image 2 1216 and Virtual Adapter 2 1212: SI 2 Buffer 1 1244 through SI 2 Buffer N 1248. For System Image 2, the buffers in the list have different sizes. At initial configuration, and during reconfigurations, Hypervisor 1294 loads the PCI Family Adapter's Physical Adapter Memory Translation Table 1290 with the starting and ending address (or starting address and length) of one or more pages. The Physical Adapter Memory Translation Table 1290 then defines the set of addresses that Virtual Adapter 2 1212 can use in Direct Memory Access (DMA) Write and Read Operations. After Physical Adapter Memory Translation Table 1290 has been created, PCI Family Adapter 1201 (or Virtual Adapter 2 1212) must validate that each DMA Write or DMA Read requested by System Image 2 1216 is contained in the Physical Adapter Memory Translation Table 1290 and associated with Virtual Adapter 2 1212. If the DMA Write or DMA Read requested by System Image 2 1216 is contained in the Physical Adapter Memory Translation Table 1290 and associated with Virtual Adapter 2 1212, then Virtual Adapter 2 1212 may perform the operation. Otherwise Virtual Adapter 2 1212 must not perform the operation. The Physical Adapter Memory Translation Table 1290 also defines the set of addresses that System Image 2 1212 can use in Programmed I/O (PIO) Write and Read Operations. After Physical Adapter Memory Translation Table 1290 has been created, PCI Family Adapter 1201 (or Virtual Adapter 2 1212) must validate that Programmed I/O Write or Read requested by System Image 2 1216 is contained in the Physical Adapter Memory Translation Table 1290 and associated with Virtual Adapter 2 1212. If the PIO Write or PIO Read requested by System Image 2 1216 is contained in the Physical Adapter Memory Translation Table 1290 and associated with Virtual Adapter 2 1212, then Virtual Adapter 2 1212 may perform the operation. Otherwise Virtual Adapter 2 1212 must not perform the operation.

Figure 13:
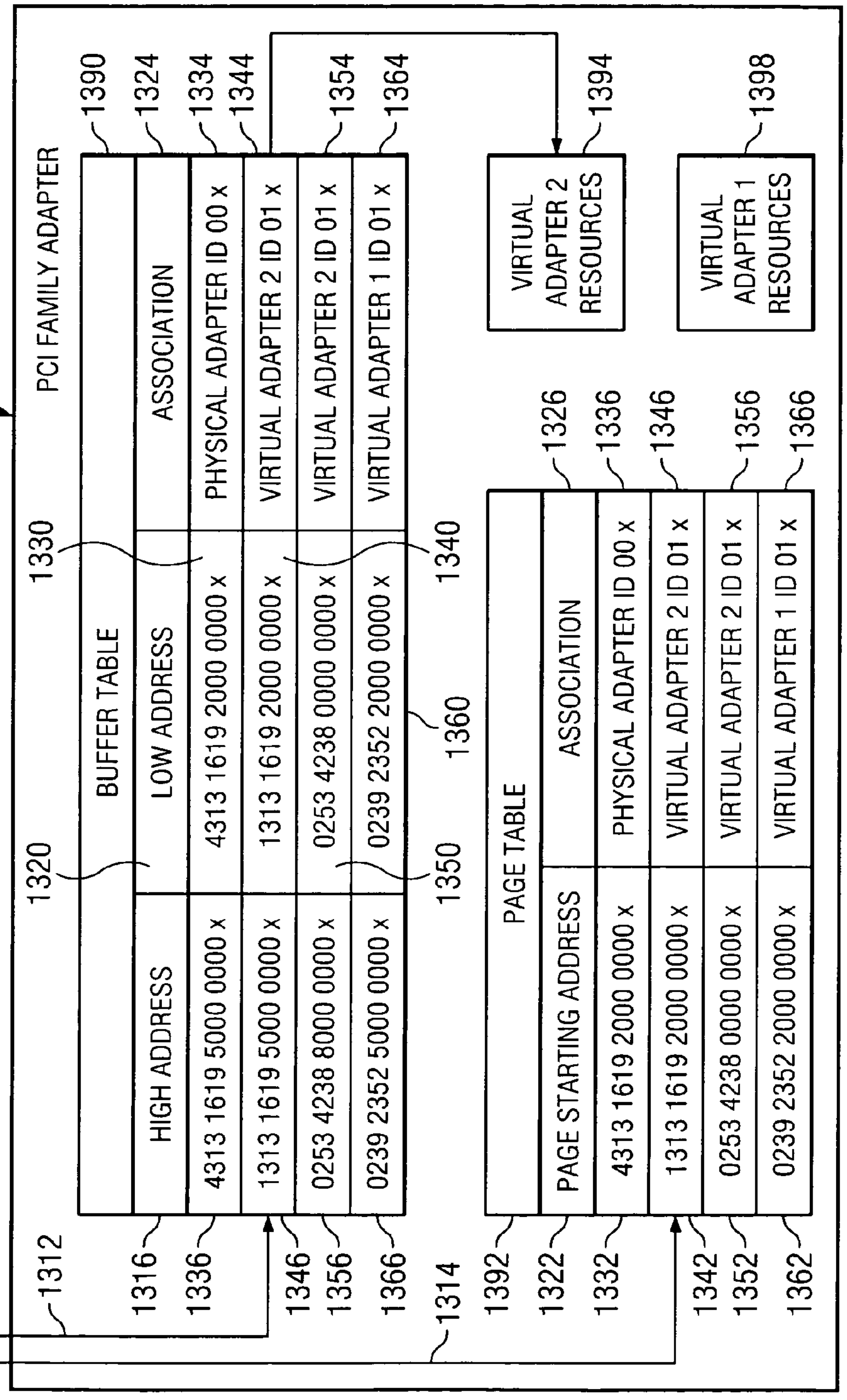
FIG. 13 is a diagram illustrating one of the options for determining the virtual adapter that is associated with an incoming memory address to assure that the functions performed by an incoming PCI bus transaction are within the scope of the virtual adapter that is associated with the memory address referenced in the incoming PCI bus transaction translation in accordance with a preferred embodiment of the present invention.

With reference next to FIG. 13, a functional block diagram of the PCI Family Adapter, such as PCI Family Adapter 1300, Physical Address Memory Translation Table, such as Buffer Table 1390 or Page Table 1392, is depicted in accordance with a preferred embodiment of the present invention.

FIG. 13 depicts four mechanisms for how the address referenced in an incoming PCI Bus Transaction, such as Bus Transaction 1304, can be used to look up the Virtual Adapter Resources (including the local PCI Family Adapter memory address that has been mapped to the host address), such as Virtual Adapter 1 Resources 1398 and Virtual Adapter 2 Resources 1394, associated with that memory address.

The first mechanism is to compare the incoming PCI Bus Transaction's, such as Bus Transaction 1304, memory address 1308 with each row of High Address 1316 and Low Address 1320 in the Buffer Table 1390 as shown by arrow 1312. If the incoming PCI Bus Transaction, such as Bus Transaction 1304, has an address that is lower than the contents of a High Address 1316 cell, and higher than the contents of the associated Low Address 1320 cell, then the incoming PCI Bus Transaction, such as Bus Transaction 1304, is within the High Address and Low Address cells that are associated with a Virtual Adapter (as indicated by column 1324) and the incoming PCI Bus Transaction, such as Bus Transaction 1304, is allowed to be performed on the matching Virtual Adapter. If the incoming PCI Bus Transaction, such as Bus Transaction 1304, has an address that is not between the contents of a High Address 1316 cell and the contents of the associated Low Address 1320 cell, then the incoming PCI Bus Transaction, such as Bus Transaction 1304, must not be allowed to complete. The second mechanism is to simply allow a single entry in the Buffer Table 1390 per Virtual Adapter.

The third mechanism is to compare the incoming PCI Bus Transaction's, such as Bus Transaction 1304, memory address 1308 with each row of Page Starting Address 1322 and with each row of Page Starting Address 1322 plus the page size in the Page Table 1392 as shown by arrow 1314. If the incoming PCI Bus Transaction, such as Bus Transaction 1304, has an address that is higher than or equal to the contents of the Page Starting Address 1322 cell and lower the Page Starting Address 1322 cell plus the page size, then the incoming PCI Bus Transaction, such as Bus Transaction 1304, is within a Page that is associated with a Virtual Adapter (as indicated by column 1326) and the incoming PCI Bus Transaction, such as Bus Transaction 1304, is allowed to be performed on the matching Virtual Adapter. If the incoming PCI Bus Transaction, such as Bus Transaction 1304, has an address that is not within the range of the Page Starting Address 1322 cell and the Page Starting Address 1322 cell plus the page size, then the incoming PCI Bus Transaction, such as Bus Transaction 1304, must not be allowed to complete. The fourth mechanism is to simply allow a single entry in the Page Table 1392 per Virtual Adapter.

Figure 14:
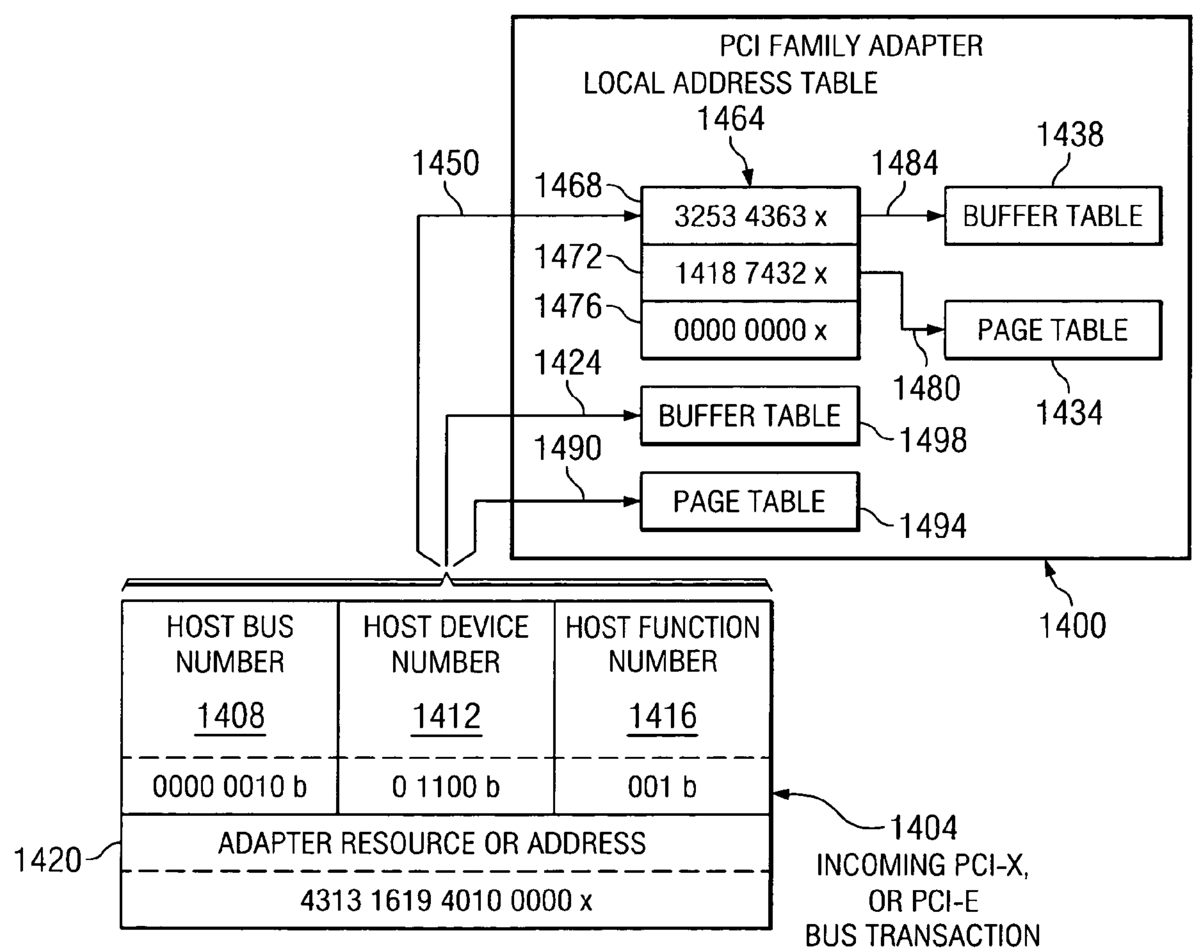
FIG. 14 is a diagram illustrating one of the options for determining the virtual adapter that is associated with an PCI-X or PCI-E bus transaction to assure that the functions performed by an incoming PCI bus transaction are within the scope of the virtual adapter that is associated with the Requestor Bus Number, Requestor Device Number, and Requestor Function Number referenced in the incoming PCI bus transaction translation in accordance with a preferred embodiment of the present invention.

With reference next to FIG. 14, a functional block diagram of the PCI Family Adapter, such as PCI Family Adapter 1400, is depicted in accordance with a preferred embodiment of the present invention.

FIG. 14 depicts several mechanisms for how the Requestor Bus Number, such as Host Bus Number 1408, Requestor Device Number, such as Host Device Number 1412, and Requestor Function Number, such as Host Function Number 1416, referenced in an incoming PCI Bus Transaction, such as Bus Transaction 1404, can be used to index into either a Buffer Table, such as Buffer Table 1498, as indicated by arrow 1424, a Page Table, such as Page Table 1494, as indicated by arrow 1490, or an indirect Local Address Table, such as Local Address Table 1464, as indicated by arrow 1450. Buffer Table 1498 contains the same contents as Buffer Table 1390 in FIG. 13. Page Table 1490 contains the same contents as Page Table 1392 in FIG. 13. Local Address Table 1464 contains local PCI Family Adapter memory addresses, such as is shown at 1468, 1472 and 1476, that reference either a Buffer Table, such as Buffer Table 1438, as indicated by arrow 1484, or a Page Table, such as Page Table 1434, as indicated by arrow 1480, that only contains host memory addresses that are mapped to the same Virtual Adapter.

Using the Requestor Bus Number, such as Host Bus Number 1408, Requestor Device Number, such as Host Device Number 1412, and Requestor Function Number, such as Host Function Number 1416, referenced in an incoming PCI Bus Transaction, such as Bus Transaction 1404, provides an additional check beyond the memory address mappings using received address 1420 that were set up by a host LPAR manager.

Figure 15:
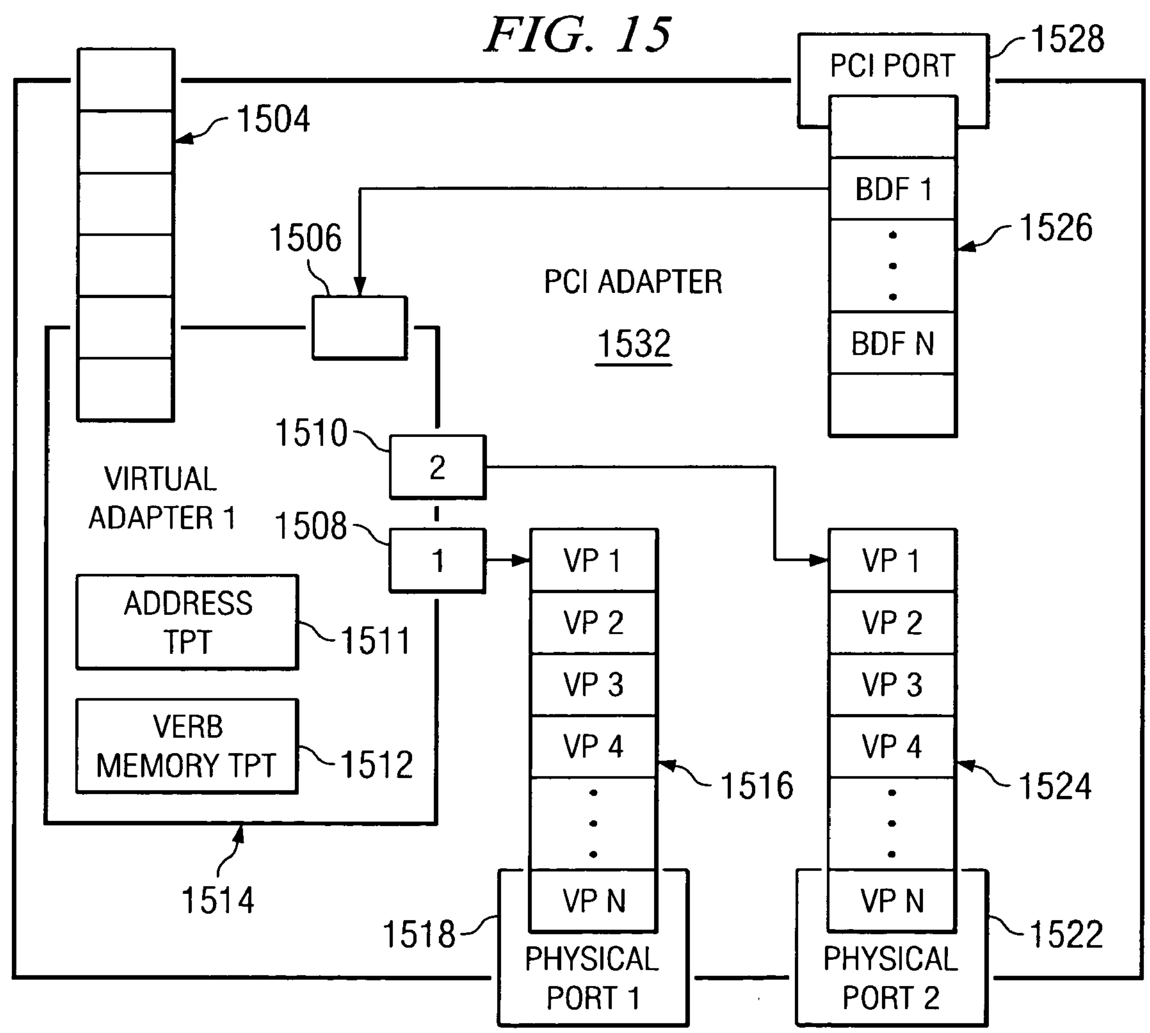
FIG. 15 is a diagram illustrating a virtual adapter management approach for virtualizing adapter in accordance with a preferred embodiment of the present invention.

Turning next to FIG. 15, a Virtual Adapter Level Management Approach is depicted. Under this approach, a physical or virtual host creates one or more Virtual Adapters, such as Virtual Adapter 1 1514, each containing a set of resources that is within the scope of the Physical Adapter, such as PCI Adapter 1532. Physical PCI adapter 1532 contains one or more physical PCI ports, such as physical PCI port 1528, and one or more down stream physical ports, such as Physical Ports 1518 and 1522. Processing means within the physical PCI adapter 1532 create virtual PCI ports each with their own bus number, device number and function number, such as BDF 1 through BDF N depicted at 1526. The virtual adapter, such as Virtual Adapter 1 1514, has a PCI port address, such as 1506, associated with a given virtual PCI port, such as 1526, for the physical PCI port, such as PCI Port 1528. Processing means with the physical PCI adapter 1532 also creates virtual downstream ports, such as VP 1 through VP N for physical down stream port 1518, depicted at 1516, and VP 1 through VP N for physical down stream port 1522, depicted at 1524. The virtual adapter, such as Virtual Adapter 1 1514, has a down stream port address, such as 1508 and 1510, associated with a given virtual down stream port, such as 1516 and 1524, for each physical port, such as Physical Port 1 1518 and Physical Port 2 1522. The virtual adapter also has a The set of resources associated with the Virtual Adapter 1 1514 minimally include at least one virtual PCI port, such as BDF 1 in 1526, for each physical PCI port, such as physical port 1528; and one virtual down stream port, such as VP 1 in 1516 and 1524, for each physical down stream port, such as physical down stream ports 1518 and 1522. The set of resources associated with the Virtual Adapter 1 1514 may also include: processing queues and associated resources, such as 1504, and one or more Memory Translation and Protection Tables, such as Address TPT 1511 and Verb Memory TPT 1512. Thus, each of the virtual adapters, such as virtual adapter 1 1514, that are created by physical PCI adapter 1532 appears to all logical entries outside of physical PCI adapter 1532 to be totally independent adapters, with their own PCI and down stream addresses.

Figure 16:
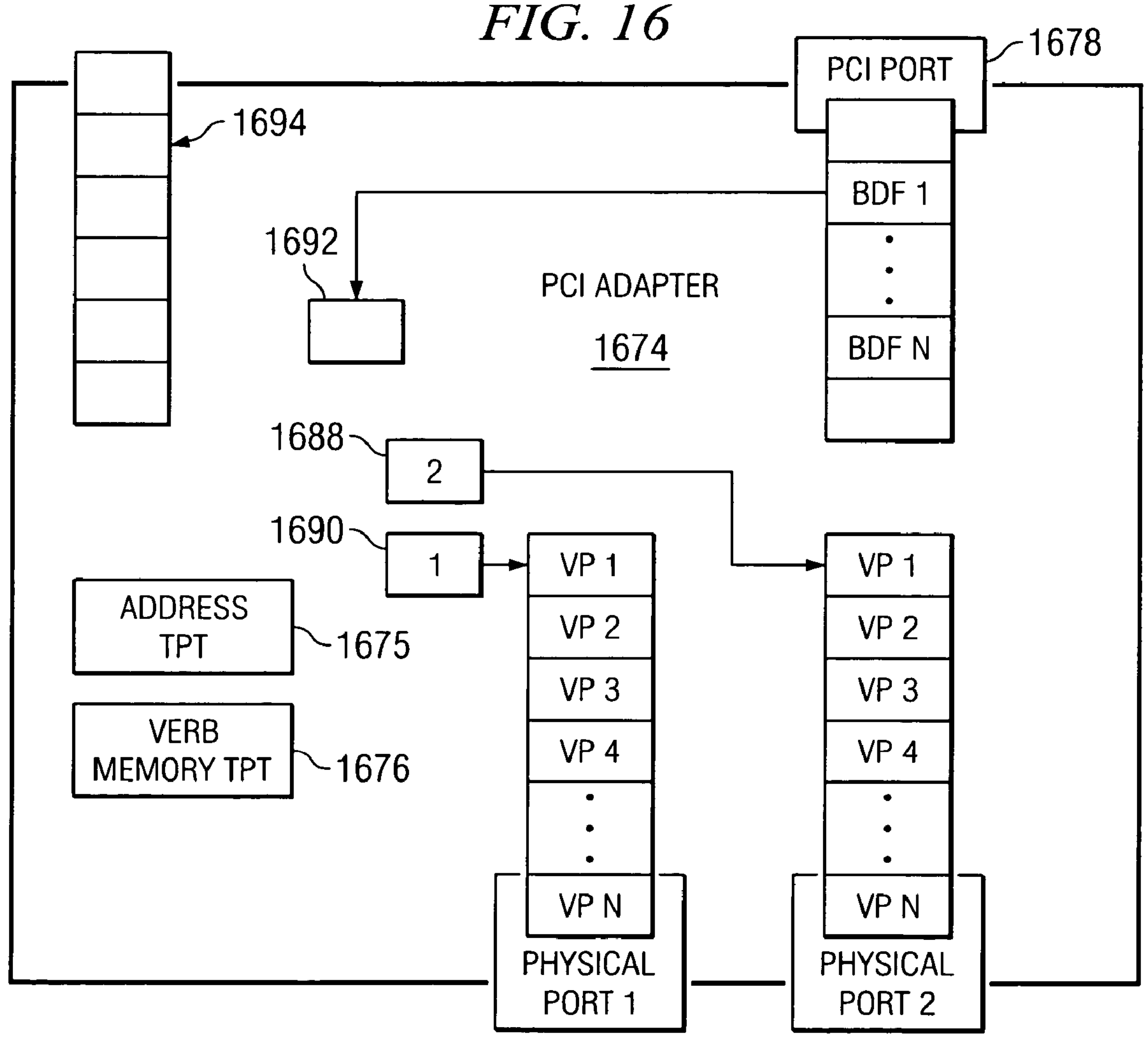
FIG. 16 is a diagram illustrating a virtual resource management approach for virtualizing adapter resources in accordance with a preferred embodiment of the present invention.

Turning next to FIG. 16, a Virtual Resource Level Management approach is depicted. Under this approach, a physical or virtual host creates one or more Virtual Resources, such as Virtual Resource 1694 which represents a Processing Queue, 1692 which represents a Virtual PCI Port, 1688 and 1690 which represent a Virtual Downstream Port, and 1675 and 1676 which represent Address Translation and Protection Tables for the PCI bus and verb memory, respectively. Under this approach, the various virtual adapters created by physical PCI adapter 1674 do not have their own PCI bus number, device number and function number, but instead are represented by a subset of the address space of the single bus number, device number, and function number assigned to physical adapter 1674.

Figure 17:
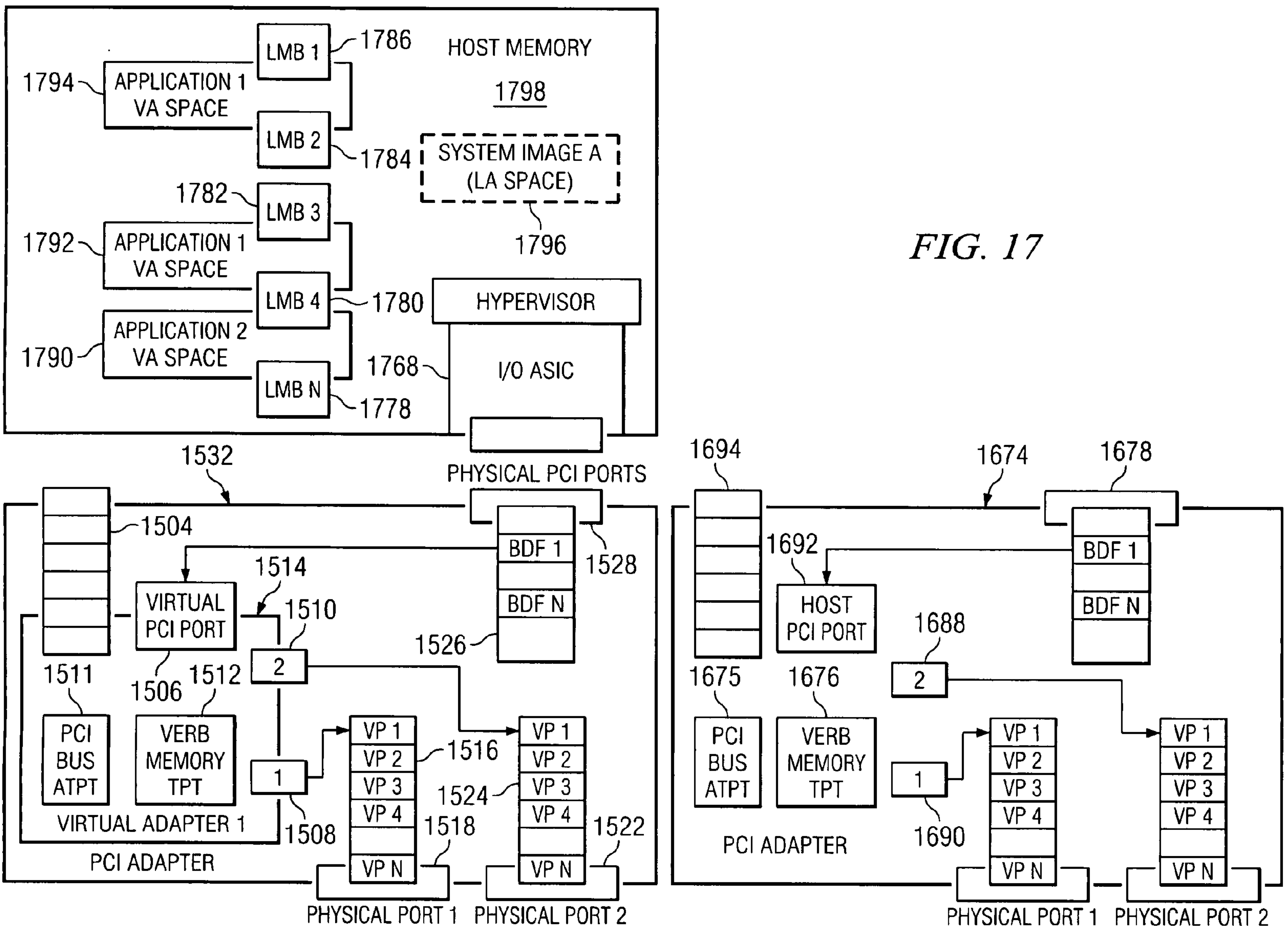
FIG. 17 is a diagram illustrating an adapter virtualization approach, where an LPAR manager is responsible for managing the address translation and protection tables on the host, and the system image is responsible for controlling the address translation and protection tables on the adapter in accordance with a preferred embodiment of the present invention.

Turning next to FIG. 17, a diagram illustrating an adapter virtualization approach that allows a System Image within a multiple System Image Virtual Server to directly expose a portion, or all, of its associated System Memory to a shared PCI Adapter without having to go through a trusted component, such as a LPAR manager, is depicted. Using the mechanisms described in this document, a System Image is responsible for registering physical memory addresses it wants to expose to a virtual adapter or virtual resource with the LPAR manager. The LPAR manager is responsible for translating physical memory addresses exposed by a System Image into PCI bus addresses used on the PCI bus which equal the real memory addresses used to access memory. The LPAR manager is responsible for setting up the adapter's PCI Bus Address Translation and Protection Table (ATPT) with these translations and access controls and communicating to the System Image when this process is complete. The System Image is responsible for registering memory, including the physical memory addresses, with the adapter. The adapter's PCI Bus ATPT is responsible for performing access control on DMA operations in accordance with a preferred embodiment of the present invention. The adapter's verb memory ATPT is responsible for: associating a resource to one or more PCI virtual ports and to one or more virtual downstream ports; performing the registrations requested by a System Image; and performing the I/O transaction requested by a System Image in accordance with a preferred embodiment of the present invention.

FIG. 17 depicts a virtual system image, such as System Image A 1796, which runs in host memory, such as Host Memory 1798, and has applications running on it. Each application has its own Virtual Address (VA) space, such App 1 VA Space 1792 and 1794, and App 2 VA Space 1790. The VA Space is mapped by the OS into a set of physically contiguous physical memory addresses. The LPAR manager maps physical memory addresses to PCI bus addresses used on the PCI bus which equal the real memory addresses used to access memory. In FIG. 17, Application 1 VA Space 1794 maps into a portion of Logical Memory Block (LMB) 1 1786 and 2 1784. Similarly, Application 1 VA Space 1792 maps into a portion of Logical Memory Block (LMB) 3 1782 and 4 1780. Finally, Application 2 VA Space 1790 maps into a portion of Logical Memory Block (LMB) 4 1780 and N 1778.

A System Image, such as System Image A 1796 depicted in FIG. 17, does not directly expose the real memory addresses, such as the addresses used by the I/O ASIC, such as I/O ASIC 1768, used to reference Host Memory 1798, to the PCI Adapter, such as PCI Adapter 1532 and 1674. Instead, the host depicted in FIG. 17 assigns a PCI Bus Address Translation and Protection Table to a System Image and to either: a Virtual Adapter or Virtual Resource; a set of Virtual Adapters and Virtual Resources; or to all Virtual Adapters and Virtual Resources. For example, PCI Bus Address Translation and Protection Table 1511 contains the list of Host real memory addresses associated with System Image A 1796 and Virtual Adapter 1 1514. Similarly, PCI Bus Address Translation and Protection Table 1675 contains the list of Host real memory addresses associated with System Image A 1796 and the Virtual Resource(s) that are associated with PCI Bus Address Translation and Protection Table 1675.

When a PCI Adapter, such as PCI Adapter 1532 and 1674, processes a data segment referenced by a work queue element on one of its processing queues, it compares the protection domain associated with the processing queue to the protection domain associated with the memory region referenced by the data segment. If the two do not match, the operation ends in an error. If they match, the PCI Adapter, such as PCI Adapter 1532 and 1674, compares the PCI Bus Address referenced by the data segment through the memory region mapping to the list of PCI Bus Addresses contained in the PCI Bus ATPT. If the PCI Bus Address referenced by the data segment through the memory region mapping is not in the list of PCI Bus Addresses contained in the PCI Bus ATPT, the operation ends in an error. If the PCI Bus Address referenced by the data segment through the memory region mapping is in the list of PCI Bus Addresses contained in the PCI Bus ATPT, the operation proceeds.

FIG. 17 also depicts two PCI adapters, one that uses a Virtual Adapter Level Management approach, such as PCI Adapter 1532, and one that uses a Virtual Resource Level Management approach, such as PCI Adapter 1674.

In FIG. 17, the PCI Adapter 1532 must associate to a host side System Image the following: one set of processing queues; either a Verb Memory Address Translation and Protection Table or one set of Verb Memory Address Translation and Protection Table entries; one downstream virtual port; either a list of PCI Bus memory addresses from a single PCI Bus Address Translation and Protection Table or a PCI Bus Address Translation and Protection Table that is referenced by using the a Virtual Host (PCI) ID, such as the virtual host's PCI Bus, Device, Function Number; one downstream virtual port; and one upstream Virtual Adapter (PCI) ID (VAID), such as the Bus, Device, Function Number.

FIG. 18 is a flowchart outlining the functions used to manage the adapter's address translations and protection tables, such as those shown at 1511 and 1675 of FIG. 17.

FIG. 18 is entered on 1800, when the LPAR manager, or a LPAR manager appointed intermediary, is invoked to perform an Address Translation and Protection Table (ATPT) operation. A System Image may perform the invocation in order to register physical memory addresses with the host ATPT, adapter ATPT, or both. A system user, through a management user interface, may perform the invocation in order to create, modify, or destroy an adapter instance and associate that adapter with a new or existing System Image. The LPAR manager itself may perform the invocation in order to create, modify, or destroy an adapter instance and associate that adapter with a new or existing System Image as a result of an autonomic computing initiated operation.

In 1804, the LPAR manager determines the type of management operation. If the management operation is for the creation, query, modification, or destruction of a Virtual Adapter, in the case where the PCI adapter uses the Virtual Adapter Management Approach, or a Virtual Processing Queue Resource, in the case where the PCI adapter uses the Virtual Resource Management Approach, then the next step is 1808. Otherwise it is a Memory Region (MR) management operation and the next step is 1837.

Note, as previously described, a Virtual Adapter consists of: a set of processing queues, one virtual downstream port identifier, one virtual adapter (upstream port) identifier, a PCI Bus Address Translation and Protection Table (ATPT) or a set of PCI Bus Address Translation and Protection Tables (one per virtual host identifier), and either a verb style memory Address Translation and Protection Table or a set of verb style Address Translation and Protection Table entries. The processing queues includes: InfiniBand standard Queue Pairs, iWARP standard Queue Pairs, or analogous Queue Pairs; InfiniBand standard Completion Queues, iWARP standard Completion Queues, or analogous Completion Queues; and InfiniBand standard Asynchronous Event Queues, iWARP standard Asynchronous Event Queues, or analogous Asynchronous Event Queues.

Also note, as previously described, a Virtual Resource consists of a set of processing queues, which are associated to: a) one virtual downstream port identifier; b) one virtual adapter (upstream port) identifier; c) through a protection domain, either an verb style ATPT or a set of verb style ATPT entries; and c) a list of PCI Bus Addresses that is obtained by looking up PCI Bus Addresses contained in a verb style ATPT and assuring that those PCI Bus Addresses are also contained in the PCI Bus ATPT. Again, the processing queues includes: InfiniBand standard Queue Pairs, iWARP standard Queue Pairs, or analogous Queue Pairs; InfiniBand standard Completion Queues, iWARP standard Completion Queues, or analogous Completion Queues; and InfiniBand standard Asynchronous Event Queues, iWARP standard Asynchronous Event Queues, or analogous Asynchronous Event Queues.

In 1808, the LPAR manager determines if the management operation is a query of the attributes associated with a Virtual Adapter, in the case where the PCI adapter uses the Virtual Adapter Management Approach, or a Virtual Processing Queue Resource, in the case where the PCI adapter uses the Virtual Resource Management Approach. If it is a query, then the LPAR manager, in 1812, queries the Virtual Adapter, in the case where the PCI adapter uses the Virtual Adapter Management Approach, or a Virtual Processing Queue Resource, in the case where the PCI adapter uses the Virtual Resource Management Approach, and returns the results of the query to the entity that invoked the LPAR manager. Otherwise the next step is 1816.

In 1816, the LPAR manager determines if the management operation is a Create of a Virtual Adapter, in the case where the PCI adapter uses the Virtual Adapter Management Approach, or a Virtual Processing Queue Resource, in the case where the PCI adapter uses the Virtual Resource Management Approach. If it is not a Create, then the LPAR manager continues to 1834. If it is a Create, then the LPAR manager, in 1820, determines if there are sufficient resources available to perform the creation. If there are sufficient resources, then, in 1824, the LPAR manager allocates the resource on the adapter and returns the results to the entity that invoked the LPAR manager. If there are not sufficient resources, then, in 1828, the LPAR manager creates an error record describing the number of resources still available and returns the results to the entity that invoked the LPAR manager. Otherwise the next step is 1824.

In 1834, the LPAR manager determines if the management operation is a Destroy of a Virtual Adapter, in the case where the PCI adapter uses the Virtual Adapter Management Approach, or a Virtual Processing Queue Resource, in the case where the PCI adapter uses the Virtual Resource Management Approach. If it is a Destroy, then the LPAR manager, in 1832, destroys the Virtual Adapter, in the case where the PCI adapter uses the Virtual Adapter Management Approach, or a Virtual Processing Queue Resource, in the case where the PCI adapter uses the Virtual Resource Management Approach, and returns the results to the entity that invoked the LPAR manager. Otherwise, in 1836, the PCI adapter resets the Virtual Adapter, in the case where the PCI adapter uses the Virtual Adapter Management Approach, or a Virtual Processing Queue Resource, in the case where the PCI adapter uses the Virtual Resource Management Approach, and returns the results to the entity that invoked the LPAR manager.

In 1837, the LPAR manager translates the addresses passed in by the OS into real memory addresses. If the Memory Region is a user space Memory Region, then the LPAR manager translates the Virtual Address and Length into a set of real memory addresses that are used by hardware to access memory. If the Memory Region is a privileged space Memory Region or a user space Memory Region that's been translated into physical memory addresses by the System Image, then the LPAR manager translates the set of physical memory addresses, which are used by the System Image to address memory, into a set of real memory addresses that are used by hardware to access memory. It then continues to step 1838.

In 1838, the LPAR manager determines if the Memory Region (MR) is associated with the System Image that invoked the LPAR manager operation. If the Memory Region is a user space Memory Region, the LPAR manager does this by translating the Virtual Address and Length into a set of real memory addresses that are used by hardware to access memory and then checking that those real memory addresses are associated with the System Image that invoked the LPAR manager operation. If the Memory Region is a privileged space Memory Region or a user space Memory Region that's been translated into physical memory addresses by the System Image, then the LPAR manager does the MR check by translating the set of physical memory addresses, which are used by the System Image to address memory, into a set of real memory addresses that are used by hardware to access memory and then checking that those real memory addresses are associated with the System Image that invoked the LPAR manager operation.

In 1838, if the MR is associated with the System Image that invoked the LPAR manager operation, then the LPAR manager continues to step 1842. Otherwise it continues to step 1858.

In 1842, the LPAR manager determines if the adapter's PCI Bus Address Translation and Protection Table (ATPT) has enough entries available to contain the real memory addresses that were translated as part of step 1838. If the adapter's PCI Bus Address Translation and Protection Table (ATPT) has enough entries available to contain the real memory addresses that were translated as part of step 1838, then the LPAR manager continues to step 1850. Otherwise it continues to step 1858.

In 1850, the LPAR manager uses the real memory addresses that resulted from step 1838 to create a set of associated PCI Bus Addresses and loads the real memory address to PCI Bus Address mapping into the adapter's PCI Bus Address Translation and Protection Table.

In 1854, the LPAR manager returns the PCI Bus Addresses that resulted from the mapping of step 1846 to the System Image that invoked the LPAR manager.

In 1862, the System Image uses the adapter's InfiniBand standard, iWARP standard, or analogous verb semantic memory registration mechanism to register the Memory Region using the PCI Bus Addresses to reference the "physical buffers or physical pages" defined by the InfiniBand standard, iWARP standard, or analogous verb semantic memory registration mechanism. During run-time the adapter uses the PCI bus addresses in the adapter's ATPT for Direct Memory Accesses and the adapter converts these PCI bus addresses into real memory addresses through the adapter's PCI Bus ATPT.

In 1858, the LPAR manager creates an error record describing the number of reason the operation could not be completed, brings down the System Image that attempted the operation.

In 1870, the management operation is considered completed.

Figure 19:
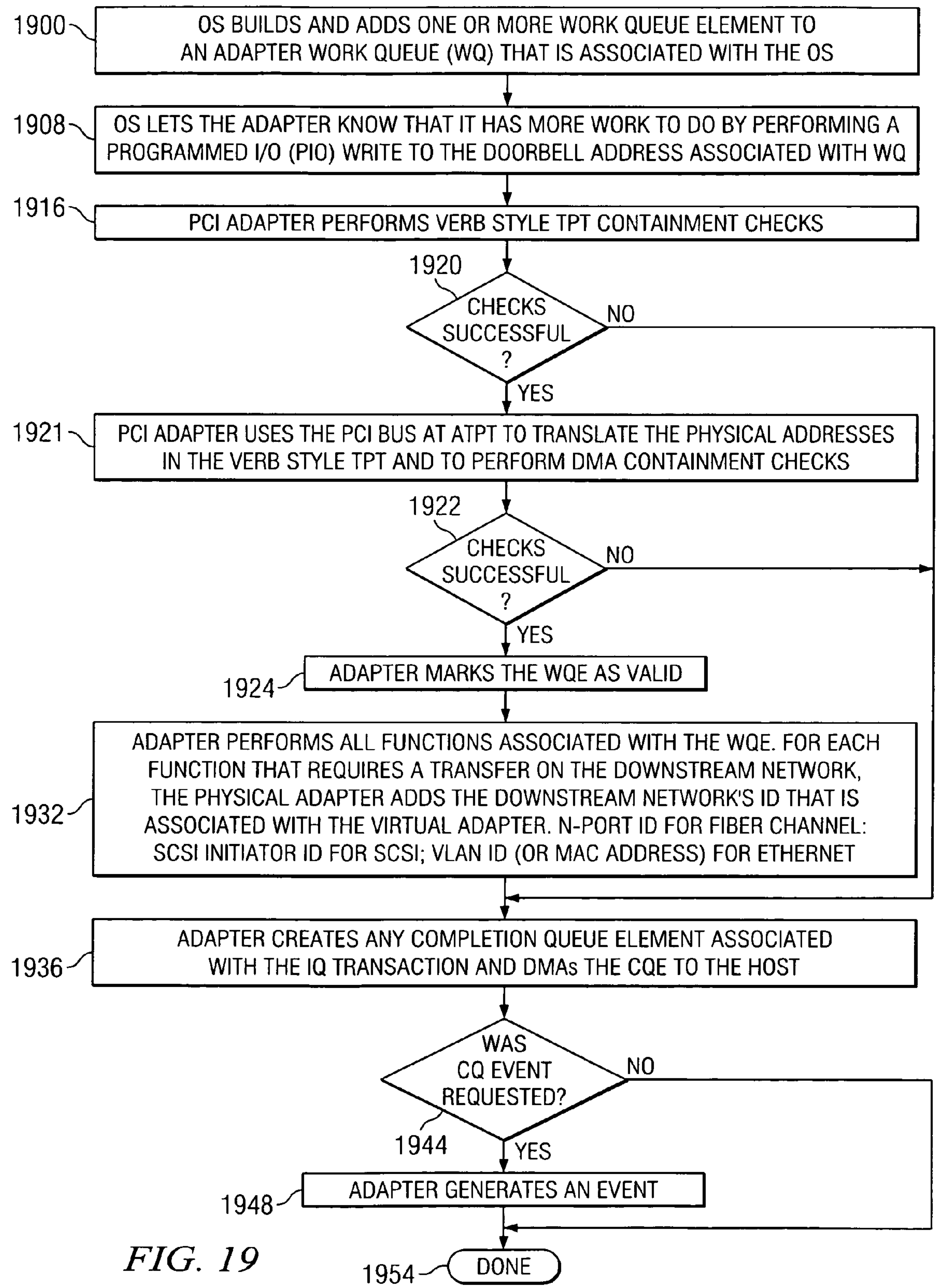
FIG. 19 is a flowchart outlining the functions performed at run-time to validate the memory access of an outbound operation on an adapter downstream port.

FIG. 19 is a flowchart outlining the functions performed at run-time to validate the memory access of an outbound operation on an adapter downstream port in accordance with a preferred embodiment of the present invention.

In 1900, the OS builds and adds one or more Work Queue Elements (WQE), containing one or more Data Segments (DSs) that reference a previously registered Memory Region, to a Work Queue (WQ) that is associated with the OS and resides on a PCI Adapter that supports either the Virtual Adapter Level (VAL) Management approach, such as PCI Adapter 1532, or the Virtual Resource Level (VRL) Management approach, such as PCI Adapter 1674. The OS code that builds the WQE may be running in either privileged or user space.

In 1908, the OS lets the adapter know that it has more work to do by performing a Memory Mapped I/O (MMIO) Write to the doorbell address associated with the WQ. The OS code that performs the MMIO may be running in either privileged or user space.

In 1916, the PCI Adapter performs Verb Style Address Translation and Protection Table (ATPT) access control checks on each Data Segment referenced by each WQE. For each check to be deemed successful, the following conditions must all apply: the Protection Domain in the Verb Style ATPT entry associated with the Data Segment must match the Protection Domain associated with the Processing Queue attempting to access that Verb Style ATPT entry; the physical memory address range referenced by the Data Segment must be within the physical memory address range in the Verb Style ATPT entry associated with the Data Segment; and the type of access requested by the WQE must be one of the access types allowed in the Verb Style ATPT entry associated with the Data Segment.

In 1920, if all the checks from 1916 were successful, then the PCI Adapter continues to 1921. Otherwise it continues on to 1936.

In 1921, the PCI Adapter performs PCI Bus Address Translation and Protection Table (ATPT) access control checks on each Data Segment referenced by each WQE. For each check to be deemed successful, the following conditions must all apply: the physical memory address range translated through the Verb Style ATPT from the Data Segment must be associated with the same System Image as the Processing Queue used to submit the WQE containing the Data Segment.

In 1922, if all the checks from 1921 were successful, then the PCI Adapter continues to 1924. Otherwise it continues on to 1936.

In 1924 the adapter marks the WQE as valid, and in 1932 the adapter performs all functions associated with the WQE. For each function that requires a transfer on the downstream network, the physical adapter adds the downstream network's ID that is associated with the virtual adapter, if the VAL approach is used, or virtual resource, if the VRL approach is used. Examples of a downstream network ID, include: N-port ID for Fibre Channel, SCSI Initiator ID for SCSI, or VLAN ID (or MAC Address) for Ethernet. If the WQE requires an upstream transfer, then for each Data Segment referenced by each WQE, the PCI Adapter obtains from the Verb Style ATPT the physical memory addresses associated with the Data Segment and uses the PCI Bus ATPT to translate these physical memory addresses into the PCI Bus Addresses, which equal real memory addresses used by the host hardware to access memory, used for the transfer.

In 1936, the adapter creates a Completion Queue Element describing the results of performing the functions associated with the WQE. The results could be all functions were completed successfully or one, or more, of the functions completed in error. In 1944, if a completion event was requested, then, in 1948 the adapter generates an event for the operation, and completes in 1954. Otherwise, the adapter completes the operation in 1954.

In 1954 the operation is complete.

FIG. 20 is a flowchart outlining the functions performed at run-time to validate the memory access of an inbound operation on an adapter downstream port in accordance with a preferred embodiment of the present invention.

In 2000, the PCI adapter receives a Virtual Address, in the case of InfiniBand, or Tagged Offset, in the case of iWARP, operation on one of its downstream ports.

In 2016, the PCI Adapter performs Verb Style Address Translation and Protection Table (ATPT) access control checks on each buffer referenced by the incoming operation. For the check to be deemed successful, the following conditions must all apply: the Protection Domain in the Verb Style ATPT entry referenced in the incoming operation's R_Key field, in the case of InfiniBand, or STag field, in the case of iWARP, must match the Protection Domain associated with the Processing Queue referenced in the incoming operation; the physical memory address range referenced by the incoming operation must be within the physical memory address range in the Verb Style ATPT entry associated with the incoming operation; and the type of access requested by the WQE must be one of the access types allowed in the Verb Style ATPT entry associated with the incoming operation.

In 2020, if all the checks from 2016 were successful, then the PCI Adapter continues to 2021. Otherwise it continues on to 2036.

In 2021, the PCI Adapter performs PCI Bus Address Translation and Protection Table (ATPT) access control checks on the incoming operation. For the check to be deemed successful, the following condition must apply: the physical memory address range translated through the Verb Style ATPT from the incoming operation's R_Key field, in the case of InfiniBand, or STag field, in the case of iWARP, must be associated with the same System Image as the Processing Queue referenced by the incoming operation.

In 2022, if all the checks from 2021 were successful, then the PCI Adapter continues to 2024. Otherwise it continues on to 2036.

In 2024 the adapter marks the incoming operation as valid, and in 2032 the adapter performs all functions associated with the operation. For each function that requires a transfer on the downstream network, the physical adapter adds the downstream network's ID that is associated with the virtual adapter, if the VAL approach is used, or virtual resource, if the VRL approach is used. Examples of a downstream network ID, include: N-port ID for Fibre Channel, SCSI Initiator ID for SCSI, or VLAN ID (or MAC Address) for Ethernet. If the incoming operation requires an upstream transfer, then the PCI Adapter obtains from the Verb Style ATPT the physical memory addresses associated with the incoming operation's R_Key field, in the case of InfiniBand, or STag field, in the case of iWARP, and uses the PCI Bus ATPT to translate these physical memory addresses into the PCI Bus Addresses, which equal real memory addresses used by the host hardware to access memory, used for the transfer.

In 2036, the adapter creates an error record describing the check that failed and tears down the connection. The error record could simply be a counter increment. It then continues to 2054.

In 2044, if the downstream port is InfiniBand, the incoming operation is an RDMA Write with Immediate and a completion event was requested by the Consumer, then, in 2048, the adapter generates an event for the incoming operation, and completes in 2054. Otherwise, the adapter completes the operation in 2054.

In 2054 the incoming operation is complete.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a data processing system for managing system resources associated with a plurality of partitions each operable for executing a software component, and a physical I/O adapter configured to provide a plurality of virtual I/O adapters for use by the plurality of partitions, a method for managing certain host memory of the data processing system with the plurality of virtual I/O adapters, comprising steps of:

maintaining a resource list for the plurality of virtual I/O adapters;

confirming, by the physical I/O adapter upon receipt of a bus transaction for one of the plurality of virtual adapters, that a resource specified in the bus transaction is specified in the resource list as an allowable resource for the one of the plurality of virtual adapters; and performing a direct memory access operation directly between the one of the plurality of virtual adapters and the certain host memory, wherein the partitions of the data processing system are hardware partitions that are each operable for simultaneously executing the software component.

2. The method of claim 1, wherein the resource list comprises at least one host memory address usable by a given virtual adapter, and the confirming step confirms that the resource specified in the bus transaction is specified in the resource list as an allowable resource for the one of the plurality of virtual adapters.

3. The method of claim 2, wherein the at least one host memory address is maintained in the resource list as a page size and page list of the host memory.

4. The method of claim 3, wherein the page list is a starting address of a memory page.

5. The method of claim 2, wherein the at least one host memory address is maintained in the resource list as at least one starting address and at least one ending address of the host memory.

6. The method of claim 1, wherein the resource list comprises at least one adapter resource of the virtual adapter that is usable by the software component, and the confirming step confirms that the resource specified in the bus transaction is specified in the resource list as an allowable resource for use by the software component.

7. The method of claim 6, wherein the at least one adapter resource is a memory address specified by a starting page address and page size of the adapter memory.

8. The method of claim 6, wherein the at least one adapter resource is a memory address specified by at least one starting address and ending address of the adapter memory.

9. The method of claim 1, wherein the resource list is maintained on the physical I/O adapter.

10. The method of claim 9, wherein the resource specified in the bus transaction is used to access an indirect local access table, maintained by the physical I/O adapter, comprising pointers to the resource list.

11. The method of claim 1, wherein a supervisory program within the data processing system is used in managing association of the system resources with the plurality of partitions.

12. A method in a data processing system for validating an incoming bus transaction associated with a virtual adapter, the virtual adapter being one of a plurality of virtual adapters configured within a physical I/O adapter, the method comprising steps of:

receiving the incoming bus transaction that was initiated by the virtual adapter, wherein the incoming bus transaction is received on a bus that a plurality of physical devices are each commonly connected to, where the bus is used to facilitate transfer of data between at least two of the physical devices that are commonly connected to the bus;

determining whether the received incoming bus transaction contains a resource associated with the virtual adapter;

if the resource is associated with the virtual adapter, allowing the bus transaction to occur; and performing a direct memory access operation directly between the virtual adapter and host memory of the data processing system.

13. The method of claim 12, wherein the resource is an address and wherein the determining step comprises comparing the address with address information maintained in a resource table for the virtual adapter.

14. The method of claim 13, wherein the resource table contains at least one high address and low address pair, and the bus transaction is allowed to occur if the address is within the high address and low address pair.

15. The method of claim 13, wherein the resource table contains at least page starting address and page size pair, and the bus transaction is allowed to occur if the address is within the page starting address and page starting address plus page size range.

16. A computer program product, recorded in a computer readable medium, and operable by a data processing system for managing system resources associated with a plurality of partitions and a physical I/O adapter configurable to provide a plurality of virtual I/O adapters for use by the plurality of partitions, comprising:

instructions for registering physical system memory addresses that a software component wants to expose to a virtual adapter;

instructions for translating the physical system memory addresses to bus addresses used to access the physical system memory during a bus transaction;

instructions for registering, with the virtual adapter maintained within the physical I/O adapter, the physical system memory addresses; and instructions for performing a direct memory access operation directly between the virtual adapter and the physical system memory, wherein the partitions are hardware partitions that are each operable for simultaneously executing a software component, and wherein the bus transaction is exchanged on a bus that a plurality of physical devices are each commonly connected to, where the bus is used to facilitate transfer of data between at least two of the physical devices that are commonly connected to the bus.

* * * * *